US010634803B2

(12) United States Patent
Pugh et al.

(10) Patent No.: US 10,634,803 B2
(45) Date of Patent: Apr. 28, 2020

(54) BAYSEIAN MICROSEISMIC SOURCE INVERSION

(71) Applicants: SCHLUMBERGER TECHNOLOGY CORPORATION, Sugar Land, TX (US); Cambridge Enterprise Limited, Cambridge (GB)

(72) Inventors: David J. Pugh, Cambridge (GB); Robert S. White, Cambridge (GB); Philip Andrew Felton Christie, Cambridge (GB)

(73) Assignees: SCHLUMBERGER TECHNOLOGY CORPORATION, Sugar Land, TX (US); CAMBRIDGE ENTERPRISE LIMITED, Cambridge (GB)

( * ) Notice: Subject to any disclaimer, the term of this patent is extended or adjusted under 35 U.S.C. 154(b) by 644 days.

(21) Appl. No.: 15/268,047

(22) Filed: Sep. 16, 2016

(65) Prior Publication Data
US 2017/0074997 A1   Mar. 16, 2017

Related U.S. Application Data

(60) Provisional application No. 62/219,176, filed on Sep. 16, 2015.

(51) Int. Cl.
*G01V 1/28* (2006.01)
*E21B 43/26* (2006.01)
*E21B 49/00* (2006.01)

(52) U.S. Cl.
CPC ............. *G01V 1/288* (2013.01); *E21B 43/26* (2013.01); *E21B 49/00* (2013.01); *G01V 1/282* (2013.01);
(Continued)

(58) Field of Classification Search
CPC .. G01V 1/288; G01V 1/282; G01V 2210/663; G01V 2210/646; G01V 2210/642; E21B 43/26; E21B 49/00
See application file for complete search history.

(56) References Cited

U.S. PATENT DOCUMENTS

| 2009/0010104 | A1* | 1/2009 | Leaney | G01V 1/364 367/47 |
| 2013/0238304 | A1* | 9/2013 | Glinsky | G06F 17/5009 703/6 |
| 2014/0257780 | A1* | 9/2014 | Jing | G01V 99/005 703/6 |

FOREIGN PATENT DOCUMENTS

WO   WO2017048884 A1   3/2017

OTHER PUBLICATIONS

Dando, Ben D. E. et al., "A robust method for determining moment tensors from surface microseismic data," SEG Denver 2014 Annual Meeting pp. 2261-2266 (Year: 2014).*

(Continued)

*Primary Examiner* — Rehana Perveen
*Assistant Examiner* — Steven W Crabb

(57) ABSTRACT

A method for using microseismic data during an injection or perforation event includes injecting fluid or perforating a well to create cracks in the formation. Microseismic data is obtained from the formation and forward modelling source parameter estimations are performed using a full moment tensor space source model and a double-couple source model. Likelihoods of the microseismic data are calculated for each model type by forward modelling synthetic data from a sampled source parameter probability distribution derived from each estimation, and by comparing the synthetic data with the microseismic data. The likelihoods are marginalized over prior probabilities for the source models, and Bayesian inference converts the likelihoods and prior (Continued)

probabilities to posterior probabilities. The posterior probabilities for the full tensor space and double-couple source models are compared to reveal whether an event is a fracture opening, fracture closing, or a slip on a fault plane.

11 Claims, 19 Drawing Sheets

(52) U.S. Cl.
CPC .. *G01V 2210/642* (2013.01); *G01V 2210/646* (2013.01); *G01V 2210/663* (2013.01)

(56) References Cited

OTHER PUBLICATIONS

Šílený., J., et al., "Seismic moment tensor resolution by waveform inversion of a few local noisy records—I. Synthetic tests," Geophysical Journal International, 1996, 126, pp. 605-619.
Šílený, J., et al., "Seismic Moment Tensor Resolution on a Local Scale: Simulated Rockburst and Mine-Induced Seismic Events in the Kopanang Gold Mine, South Africa," Pure and Applied Geophysics, 2006, 163(8), pp. 1495-1513.
Sivia, D. S., "Example 2: Gaussian noise and averages," in Data Analysis: A Bayesian Tutorial, 2000, Oxford University Press, Section 2.3, pp. 28-31.
Sivia, D. S., "Example 6: how many lines are there?," in Data Analysis: A Bayesian Tutorial, 2000, Oxford University Press, pp. 85-93.
Sivia, D. S., "Other examples: means, variance, dating and so on," in Data Analysis: A Bayesian Tutorial, 2000, Oxford University Press, pp. 94-98.
Snoke, J. A., "FOCMEC: FOCal MEChanism determinations," Technical Report, 2009, 22 pages.
Tape, W. et al., "A geometric comparison of source-type plots for moment tensors," Geophysical Journal International, 2012, 190, pp. 499-510.
Tape, W. et al., "A geometric setting for moment tensors," Geophysical Journal International, 2012, 190, pp. 476-498.
Templeton, D. C. et al., "Non-Double-Couple Earthquakes in the Long Valley Volcanic Region," Bulletin of the Seismological Society of America, 2006, 96(1), 69-79.
Vasco, D. W., "Moment-Tensor Invariants: Searching for Non-Double-Couple Earthquakes," Bulletin of the Seismological Society of America, 1990, 80(2), pp. 354-371.
Vavryčuk, V., "On the retrieval of moment tensors from borehole data," Geophysical Prospecting, 2007, 55(3), pp. 381-391.
Vavryčuk, V. et al., "Non-double-couple mechanisms of microearthquakes induced during the 2000 injection experiment at the KTB site, Germany: A result of tensile faulting or anisotropy of a rock?," Tectonophysics, 2008, 456 (1-2), pp. 74-93.
Wadati, K. et al., "On the Travel Time of Earthquake Waves. (Part III)," Geophysical Magazine, 1933, VII, pp. 113-137.
Wadati, K., "On the Travel Time of Earthquake Waves. (Part II)," Geophysical Magazine, 1933, VII, pp. 101-111.
Walsh, D. et al., "A Bayesian approach to determining and parametrizing earthquake focal mechanisms," Geophysical Journal International, 2009, 176(1), pp. 235-255.
Wéber, Z., "Probabilistic local waveform inversion for moment tensor and hypocentral location," Geophysical Journal International, 2006, 165(2), pp. 607-621.
Weston, J. et al., "Joint earthquake source inverstions using seismo-geodesy and 3-D earth models," Geophysical Journal International, 2014, 198(2), pp. 671-696.
Yokota, Y. et al., "Joint inversion of teleseismic and InSAR datasets for the rupture process of the 2010 Yushu, China, earthquake," Earth Planets Space, 2012, 64(11), pp. 1047-1051.
Zollo, A. et al., "Fault mechanisims from near-source data: joint inversion of S polarizations and P polarities," Geophysical Journal International, 2007, 104(3), pp. 441-451.
Aki, K. et al., "Elastic Waves from a Point Dislocation Source," in Quantitative Seismology, 2nd Edition, University Science Books, 2002, Chapter 4, Equation 4.97, 65 pages.
Pugh et al., |A Bayesian method for microseismic source inversion, Geophysical Journal International, May 18, 2016, 206, pp. 1009-1038.
Chapman, C. H., "Fundamentals of Seismic Wave Propagation," Cambridge University Press, 2004, 5 pages.
Sivia, D. S., "Data Analysis: A Bayesian Tutorial," 2002, Oxford University Press, Section 4.5, 7 pages.
Jeffreys, H., "Theory of Probability," 3rd Edition, Oxford University Press 1998, 4 pages.
O'Toole, T. B., "Studies of earthquakes and microearthquakes using near-field seismic and geodetic observations," PhD thesis, 2013, University of Oxford, 252 pages.
Baig, A et al., "Microseismic moment tensors: A path to understanding frac growth," The Leading Edge, 2010, pp. 320-324.
Bayes, T. et al., "An Essay Towards Solving a Problem in the Doctrine of Chances," by the late Rev. Mr. Bayes, F. R. S. communicated by Mr. Price, in a letter to John Canton, A. M. F. R. S, Philosophical Transactions (1683-1775), 53 (1763), pp. 370-418.
Bean, C. et al., "Influence of near-surface volcanic structure on long-period seismic signals and on moment tensor inversions: Simulated examples from Mount Etna," Journal of Geophysical Research, 2008, 113, 19 pages.
Bernth, H. et al., "A comparison of the dispersion relations for anisotropic elastodynamic finite-difference grids," Geophysics, 2011, 76(3), pp. WA43-WA50.
Brillinger, D. R. et al., "A Probability Model for Regional Focal Mechanism Solutions," Bulletin of the Seismological Society of America, 1980, 70(1), pp. 149-170.
Chapman, C. H., et al., "A new moment-tensor decomposition for seismic events in anisotropic media," Geophysical Journal International, 2012, 188(1), pp. 343-370.
Dahm, T., "Relative moment tensor inversion based on ray theory: theory and synthetic tests," Geophysics Journal International, 1996, 124(1), pp. 245-257.
Delouis, B. et al., "Joint Inversion of InSAR, GPS, Teleseismic, and Strong-Motion Data for the Spatial and Temporal Distribution of Earthquake Slip: Application in the 1999 Izmit mainshock," Bulletin of the Seismic Society of America, 2002, 92(1), pp. 278-299.
Duputel, Z. et al., "Uncertainty estimations for seismic source inversions," Geophysics Journal International, 2012, 190(2), pp. 1243-1256.
Duputel, Z. et al., "W phase source inverstion for moderate to large earthquakes (1990-2010)," Geophysics Journal International, 2012, 189(2), pp. 1125-1147.
Dziewonski, A. M. et al., "Determination of Earthquake Source Parameters from Waveform Data for Studies of Global and Regional Seismicity," Journal of Geophysical Research, 1981, 86 (B4), pp. 2825-2852.
Ekström, G. et al., "The Global CMT project 2004-2010: Centroid-moment tensors for 13,017 earthquakes," Physics of the Earth and Planetary Interiors, 2012, 200-201, pp. 1-9.
Fieller, E. C., "The Distribution of the Index in a Normal Bivariate Population," Biometrika, 24(3-4), pp. 428-440.
Ford, S. R. et al., "Identifying isotropic events using a regional moment tensor inversion," Journal of Geophysical Research, 2008 114(1), 12 pages.
Foulger, G. R. et al., "Non-double—couple microearthquakes at Long Valley caldera, California, provide evidence for hydraulic fracturing," Journal of Volcanology and Geothermal Research, 2004, 132, pp. 45-71.
Godano, M. et al., "Focal Mechanisims from Sparse Observations by Nonlinear Inversion of Amplitudes: Method and Tests on Synthetic and Real Data," Bulletin of the Seismological Society of America, 2009, 99(4), pp. 2243-2264.
Gudmundsson, B. T., et al., "Geochemical monitoring of the Krafla and Namafjall geothermal areas, N-Iceland," Geothermics, 2002, 31(2), pp. 195-243.

(56) References Cited

OTHER PUBLICATIONS

Hardebeck, J. L. et al., "A New Method for Determining First-Motion Focal Mechanisms," Bulletin of the Seismological Society of America, 2002, 92(6), pp. 2264-2276.
Hardebeck, J. L., et al., "Using S/P Amplitude Ratios to Constrain the Focal Mechanisms of Small Earthquakes," Bulletin of the Seismological Society of America, 2003, 93(6), pp. 2434-2444.
Heimann, S., "A Robust Method to Estimate Kinematic Earthquake Source Parameters," PhD thesis, 2011, Hamburg, 163 pages.
Hinkley, D. V., "On the ratio of two correlated normal random variables," Biometrika, 1969, 56(3), pp. 635-639.
Horálek, J. et al., "Source mechanisms of micro-earthquakes induced in a fluid injection experiment at the HDR site Soultz-sous-Forets (Alsace) in 2003 and their temporal and spatial variations," Geophysical Journal International, 2010, 181, pp. 1547-1565.
Houlié, N. et al., "GPS source solution of the 2004 Parkfield earthquake," Scientific Reports, 2014, 4:3646, 9 pages.
Hudson, J. A. et al., "Source Type Plot for Inversion of the Moment Tensor," Journal of Geophysical Resonance, 1989, 94(B1), pp. 765-777.
Kaeufl, P. et al., "A framework for fast probabilistic centroid-moment-tensor determination—inversion of regional static displacement measurements," Geophysical Journal International, 2013, 196, pp. 1676-1693.
Kennet, B. L. N. et al., "Seismic Source Characterization using a Neighbourhood Algorithm," Geophysical Research Letters, 2002, 27(20), pp. 3401-3404.
Kim, A. et al., "Uncertainties in full waveform moment tensor Inversion due to limited microseismic monitoring array geometry," SEG Annual Meeting, San Antonio, Texas, USA, 2011, pp. 1509-1513.
Kim, S. G. et al., "Source parameter determination of regional earthquakes in the Far East using moment tensor inversion of single-station data," Tectonophysics, 2000, 317(1-2), pp. 125-136.
Knopoff, L. et al., "The Compensated Linear-Vector Dipole: A Possible Mechanism for Deep Earthquakes," Journal of Geophysical Research, 1970, 75(26), pp. 4957-4963.
Konca, A. O. et al., "Rupture Process of the 1999 Mw 7.1 Duzce Earthquake from Joint Analysis of SPOT, GPS, InSAR, Strong Motion and Teleseismic Data: a Supershear Rupture with Variable Rupture Velocity," Bulletin of the Seismological Society of America, 2010, 100(1), pp. 267-288.
Kuge, K. et al., "Systematic non-double-couple components of earthquake mechanisms: The role of fault zone irregularity," Journal of Geophysical Research, 1994, 99(B8), pp. 15,457-15,467.
Leaney, W. S. et al., "Microseismic Sources in Anisotropic Media," presented at the 72nd EAGE Conference & Exhibition held in Barcelona, Spain, 2010, Extended Abstract FO15, 5 pages.
Lomax, A. et al., "Earthquake Location Direct, Global-Search Methods," in Encyclopedia of Complexity and System Science, Springer Science & Business Media, 2009, pp. 1-33.
Lomax, A. et al., "Probabilistic earthquake location in 3D and layered models: Introduction of Metropolis-Gibbs method and comparison with linear locations," in Advances in Seismic Location, 2000, Editors Thurber, C. H. & Rabinowitz, N. Kluwer, pp. 101-134.
Delouis, B. et al., "Joint inversion of InSar and teleseismic data for the slip history of the 1999 Izmit (Turkey) earthquake," Geophysical Research Letters, 2000, 27(20), pp. 3389-3392.
Mildon, Z. K. et al., "Closing crack earthquakes within the Krafla caldera, North Iceland," Geophysical Journal International, 2016, 207(2), 8 pages.
Minson, S. E. et al., "Bayesian inversion for finite fault earthquake source models I-theory and algorithm," Geophysical Journal International, 2013, 194, pp. 1701-1726.
Mukherjee, S. et al., "Three Types of Gamma-Ray Bursts," The Astrophysical Journal, 1998, 508 pp. 314-327.
Müller, G., "Seismic Moments and Long-Period Radiation of Underground Nuclear Explosions," bullet of the Seismological Society of America, 1973, 63(3), pp. 847-857.
O'Brien, G. S. et al., "Time reverse location of seismic long-period events recorded on Mt. Etna," Geophysical Journal International, 2011, 184, pp. 452-462.
Page, M. T. et al., "Constraining earthquake source inversions with GPS data 1: Resolution-based removal of artifacts," Journal of Geophysical Research, 2009, 114 (B01314), 13 pages.
Panza, G. F. et al., "Monitoring volcanic and geothermal areas by full seismic moment tensor inversion: are non-double-couple components always artefacts of modelling?," Geophysical Journal International, 2000, 143(2), pp. 353-364.
Pugh, D. J. et al., "Automatic Bayesian polarity determination," Geophysical Journal International, 2016, 206, pp. 275-291.
Reasenberg, P. et al., "FPFIT, FPPLOT and FPPAGE: Fortran computer programs for calculating and displaying earthquake fault-plane solutions," U.S. Geological Society, 1985, OFR 85-739, Technical Report, 109 pages.
Riedesel, M. A. et al., "Display and Assessment of Seismic Moment Tensors," Bulletin of the Seismological Society of America, 1989, 79(1), pp. 85-100.
Schuler, J. et al., "Seismic imaging of the shallow crust beneath the Krafla central volcano, NE Iceland," Journal of Geophysical Research: Solid Earth, 2015, 120, pp. 7156-7173.
Schwartz, G., "Estimating the Dimension of a Model," Annals of Statistics, 1978, 6(2), pp. 461-464.
Šílený, J. et al., "Point-source inversion neglecting a nearby free surface: simulation of the Underground Research Laboratory, Canada," Geophysical Journal International, 2001, 146(1), pp. 171-180.
Šílený, J., "Regional moment tensor uncertainty due to mismodeling of the crust," Tectonophysics, 2004, 383(3-4), pp. 133-147.
Šílený, J., "Resolution of Non-Double-Couple Mechanisms: Simulation of Hypocenter Mislocation and Velocity Structure Modeling," Bulletin of the Seismological Society of America, 2009, 99(4), pp. 2265-2272.

* cited by examiner

BAYSEIAN MICROSEISMIC SOURCE INVERSION

CROSS-REFERENCE TO RELATED APPLICATIONS

This application claims benefit of U.S. Provisional Patent Application Ser. No. 62/219,176, filed Sep. 16, 2015 and titled DETERMINING CHARACTERISTICS OF A FRACTURE/FAULT, the entire disclosure of which is herein incorporated by reference.

FIELD

The present invention relates to a Bayesian approach to microseismic source inversion, and is applicable to determination of characteristics of fractures and/or faults.

BACKGROUND

Earthquakes occur from the creation and propagation of a rupture. Rapid motion produces seismic waves, which are usually observed in the far-field. Source inversion can use such observations to describe the kinematic behaviour of the source by the moment tensor, while accounting for measurement uncertainties.

For regional and global earthquakes, it is often feasible to pre-calculate databases of Green functions to perform full waveform inversions efficiently (Heimann 2011; Duputel et al. 2012b), although this can also be done on the fly for less complex velocity structures (e.g. Dziewonski et al. 1981; Ekström et al. 2012) and even for microseismic cases (e.g. O'Toole 2013). However microseismic earthquakes are small-magnitude earthquakes often detected on a small local network of receivers. For these cases, it is difficult to compute the Green functions database because the velocity structure is rarely well constrained and the event locations are often distributed throughout the network. Furthermore, velocity variations in the region may have a large effect on the ray paths due to the close proximity of the receivers to the sources. Therefore, observations such as P- and S-wave polarities and amplitude ratios are more robust in these regimes, so are commonly used to constrain the source inversion (Reasenberg & Oppenheimer 1985; Hardebeck & Shearer 2002, 2003; Snoke 2003). Such approaches still depend on knowing the velocity model to calculate the azimuths and take-off angles of the rays from the source to the instrument. Many of the current inversions provide a result and an estimate of some misfit or quality parameter.

There are several Bayesian approaches to source inversion. Often these are based on full waveform inversion approaches (e.g. Kennet et al. 2000; Wéber 2006), and can extend the approach to near-field observations and finite-fault models (e.g. Zollo & Bernard 2007; Minson et al. 2013), or other data sources (e.g. O'Toole 2013; Kaeufl et al. 2013).

The source function of an earthquake is a function of both time and position, although, in the case of microseismic events, the time dependence is generally modelled as a step function, so it is usually assumed that there is no spatial dependence of the time component. Therefore, the source function can be split into the time-dependent source-time function, $S(t)$, and the spatially dependent moment tensor, $M$. The moment tensor describes the nine force couples required to define a point source (FIG. 1). While angular momentum is conserved, the moment tensor must be symmetrical and, therefore, there are six independent components.

In most cases, especially for teleseismic events, the moment tensor appears to be double-couple or close to double-couple, signifying slip along a fault plane. Some non-double-couple mechanisms have been observed, such as those associated with nuclear explosions (Müller 1973; Ford et al. 2008), and potentially non-double-couple mechanisms in events in volcanic and geothermal regions and other areas associated with induced seismicity, such as hydraulic fracturing (Vasco 1990; Foulger et al. 2004; Templeton & Dreger 2006; Vavryčuk et al. 2008). These non-double-couple mechanisms could arise from processes such as conduit collapse or fracture opening, perhaps associated with fluid movement. However, apparent (but incorrect) non-double-couple characteristics can also be caused by uncertainties in the inversion such as noise in the data or velocity model uncertainties, finite fault effects (Kuge & Lay 1994), as well as the improved fit due to the extra two parameters in the full moment tensor compared to the double-couple source (Panza & Sarao 2000).

The six independent moment tensor components can be written as a six-vector, in a form similar to the Voigt form (Voigt 1910) and that of Chapman & Leaney (2011). Using this notation, it is possible to write the far-field seismic amplitude equation as shown in eq. (1), where a is the matrix of station propagation coefficients, $a_{STA_i}$ (a derivation of the isotropic propagation coefficients can be found in Appendix A), u is the vector of amplitudes recorded at the receiver stations $STA_i$ and $\tilde{M}$ is the six-vector form of the moment tensor M.

$$u = \begin{pmatrix} u_{STA_1} \\ u_{STA_2} \\ u_{STA_3} \\ u_{STA_4} \\ u_{STA_5} \\ \vdots \end{pmatrix} = \begin{pmatrix} a_{STA_1} \\ a_{STA_2} \\ a_{STA_3} \\ a_{STA_4} \\ a_{STA_5} \\ \vdots \end{pmatrix} \begin{pmatrix} M_{11} \\ M_{22} \\ M_{33} \\ \sqrt{2}\,M_{23} \\ \sqrt{2}\,M_{13} \\ \sqrt{2}\,M_{12} \end{pmatrix} = a \cdot \tilde{M}. \quad (1)$$

The six-vector components are scaled in eq. (1) so that the six-vector can be normalized to give a normalized moment tensor (eq. 2), defined following Chapman & Leaney (2011):

$$\sum_{i,j=1}^{3} M_{ij}^2 = 1. \quad (2)$$

Because eq. (1) is linear, a suitable left pseudo-inverse can be calculated and the moment tensor determined. The seismic amplitude equation (eq. 1) can also represent the full waveform problem, with u signifying the vector of waveforms and the station propagation coefficients (a), now time dependent and containing the Green functions and station responses. This is again a linear problem for known Green functions.

When using first-motion polarity information (Y) for source inversion, the signum function prevents a linear inversion approach:

$$Y = \text{sgn}(a \cdot \tilde{M}). \quad (3)$$

For amplitude inversions, the propagation effects are dependent on the velocity structure and attenuation models used, whereas amplitude ratios are less dependent on these, and so are often used in preference to absolute amplitudes (Hardebeck & Shearer 2002, 2003; Snoke 2003). While it is possible to invert directly for the moment tensor using amplitudes or amplitude ratios, multiple different observation types can make it difficult to invert for the source directly, and impossible when using the easily measured first-motion polarities due to the non-linear signum function (eq. 3).

SUMMARY

The present invention takes a Bayesian approach to source inversion, and is typically focussed on the far-field observations such as polarities and amplitude ratios, rather than the full waveform approach, because these measurements are more robust when the velocity model is uncertain. Walsh et al. (2009) explored a method for determining double-couple focal mechanism parameters using P-wave polarities. The approach of the present invention is consistent with that framework and extends it to different independent observation types and to full moment tensor inversion. This inversion process also enables a comparison of the best fitting double-couple and full moment tensor solutions to be made. This allows a more detailed examination of any non-double-couple components.

In a first aspect, the present invention provides a method for processing microseismic data whereby the relative probability of an earthquake source model type, or combination of source model types, is estimated by:
  performing forward modelling source parameter estimation on the microseismic data, the estimation being constrained to one or more selected source model types;
  calculating the likelihoods of the microseismic data for given source model types by forward-modelling synthetic data from a sampled source parameter probability distribution derived from the estimation for each given source model type, and comparing the synthetic data against the microseismic data;
  marginalizing the calculated data likelihoods over prior probabilities for the model parameters for the given source model types to give respective likelihoods for the given source model types; and
  using Bayesian inference to convert the source model type likelihoods and the prior probabilities to posterior probabilities for the source model types.

In a related second aspect, the present invention provides a method for processing microseismic whereby the relative probability of an earthquake source model type (such as double-couple), or combination of source model types, may be estimated by:
  performing source parameter inversion constrained to a selected source model type and for the unconstrained full moment tensor solution;
  testing the likelihood of the data for any given source model type by forward-modelling synthetic data from an appropriately sampled parameter probability distribution for the given source model type and comparing these data against the uncertain observations;
  marginalizing over the prior probabilities for the model parameters for the source model type;
  using Bayesian inference to convert model likelihoods to posterior probabilities for each source model type.

The method of the first or second aspect may include a preliminary step of performing seismic testing, e.g. using one or more hydrophones, geophones, accelerometers, and/or distributed acoustic sensing, to obtain the microseismic data.

In a further aspect, the present invention provides a procedure for performing a hydraulic fracturing operation in a well including:
  injecting fluid into the well to create cracks in downhole rock formations;
  simultaneously obtaining microseismic data from the formations;
  performing the method of the first or second aspect to process the obtained microseismic data; and
  using the processed microseismic data to reveal the extent and source type of cracks created by the injection of the fluid.

Further aspects of the present invention provide: a computer program comprising code which, when run on a computer, causes the computer to perform the method of the first or second aspect; a computer readable medium storing a computer program comprising code which, when run on a computer, causes the computer to perform the method of the first or second aspect; and a computer system programmed to perform the method of the first or second aspect. For example, a computer system may be provided for processing microseismic data, whereby the system estimates the relative probability of an earthquake source model type, or combination of source model types, the system including one or more processors arranged to: (i) perform forward modelling source parameter estimation on the microseismic data, the estimation being constrained to one or more selected source model types; (ii) calculate the likelihoods of the microseismic data for given source model types by forward-modelling synthetic data from a sampled source parameter probability distribution derived from the estimation for each given source model type, and comparing the synthetic data against the microseismic data; (iii) marginalize the calculated data likelihoods over prior probabilities for the model parameters for the given source model types to give respective likelihoods for the given source model types; and (iv) use Bayesian inference to convert the source model type likelihoods and the prior probabilities to posterior probabilities for the source model types. The system may further include a storage medium storing the microseismic data.

In a further aspect, the present invention provides a method for estimating the magnitude and/or associated uncertainty in an earthquake source model parameter using microseismic measurements according to any one of the embodiments described herein.

In a further aspect, the present invention provides a method for processing microseismic data whereby the probability of an earthquake source model type may be estimated using a method of Bayesian inference, given a set of noisy seismic data recorded by stations with positional uncertainty, and an earth model with uncertain parameters.

Optional features of the invention will now be set out. These are applicable singly or in any combination with any aspect of the invention.

The constrained source parameter estimation may be performed for one or more source model types selected from the group consisting of: a double-couple source model type, a volumetric opening source model type, a volumetric closing source model type, and a combined tensile crack and double-couple source model type.

The forward modelling source parameter estimation may also be performed for the unconstrained full moment tensor solution.

The sampled parameter probability distribution may include a probability distribution of seismic wave first-arrival polarity and/or of seismic wave amplitude ratio.

BRIEF DESCRIPTION OF THE DRAWINGS

Embodiments of the invention will now be described by way of example with reference to the accompanying drawings in which.

Figure 18:
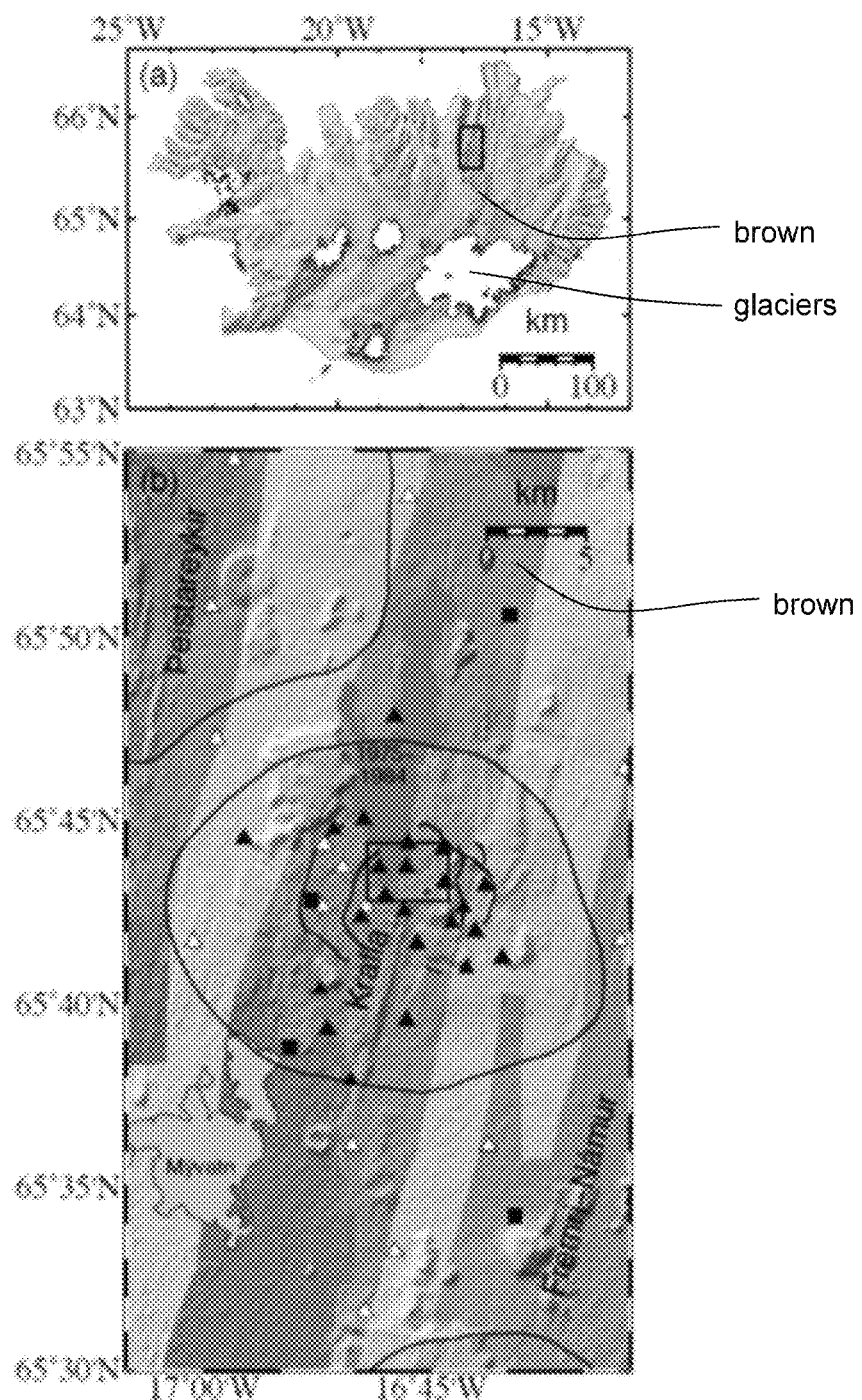

FIG. 18. Map of the receiver locations for the Krafla temporary network for the events in Section 7. (a) shows a tectonic map of Iceland (Einarsson & Sæmundsson 1987) with brown shading indicating the location of fissure swarms associated with volcanic systems. Glaciers are shown with white fill. The black rectangle shows location of (b) in the Northern Volcanic Zone. (b) Map of the seismic network. Brown shading shows extent of main fissure swarms associated with different volcanic systems. The solid black outlines show the extent of central volcanoes, and the inner sub-circular outline at Krafla indicates the extent of the caldera. Black and white symbols show the seismometer locations: black squares show the permanent Icelandic Meteorological Office seismometers; solid black triangles show temporary seismometers operating from July 2009 and white triangles show additional seismometer sites used during July 2010 to September 2011. The black rectangle shows the region where the seismicity occurred.

Figure 9:
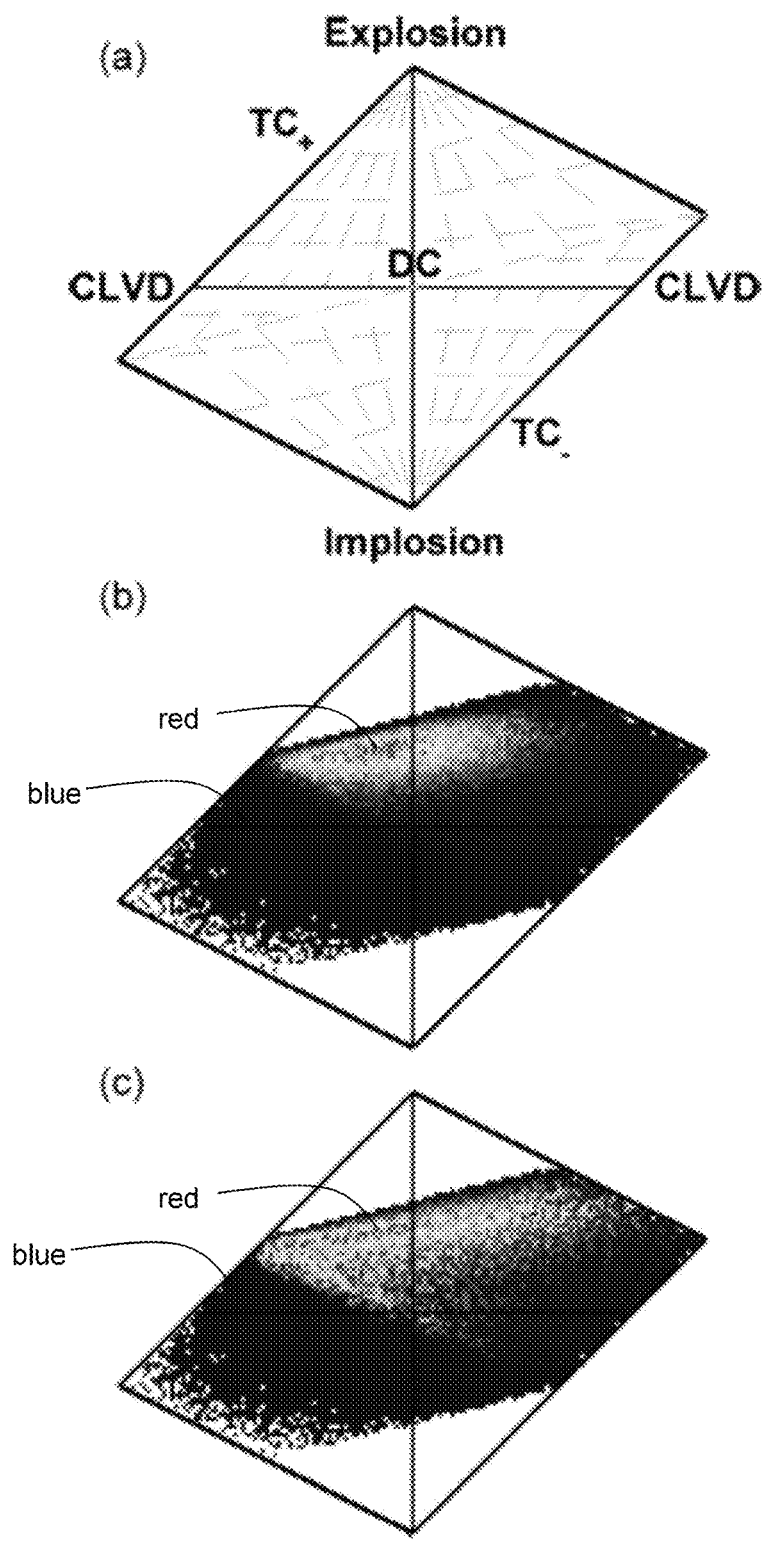
FIG. 9. Comparison of marginalized and silhouette plots of the source PDF types for an example real event. (a) shows the position of different source types on the Hudson plot, with the double-couple point located where the axes cross. Several source types are shown on the plot: the compensated linear vector dipole (CLVD) end members (Knopoff & Randall 1970), the implosive and explosive sources, the positive and negative tensile crack sources (TC+ and TC−) for a Poisson's ratio of 0.25, and the double-couple source (DC). (b) shows the marginalized source PDF, and (c) the silhouette plot of the source PDF for the equal area Hudson plot. Red shows high probability, and blue low (non-zero) probability.
Figure 19:
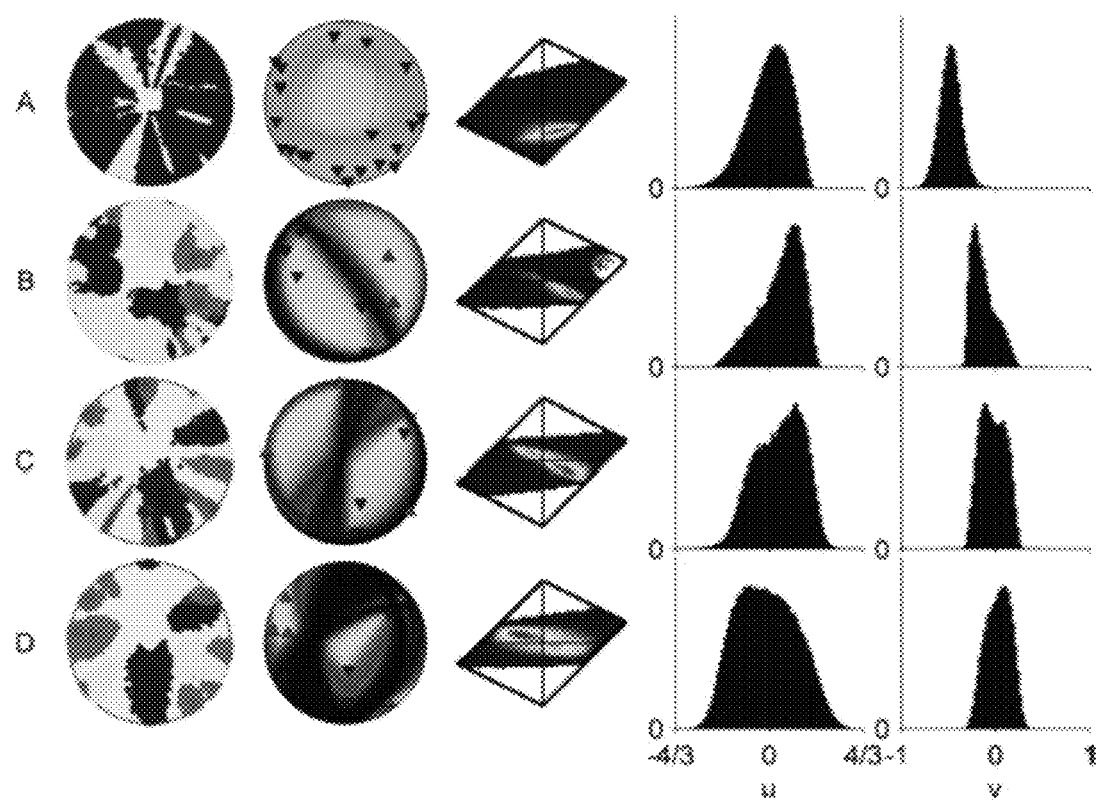

FIG. 19. Lower hemisphere equal area projections, Hudson plots and marginalized distributions of the Hudson u and v parameters of four events from the Krafla geothermal region of Iceland. The first column shows the station ray position distribution from the NonLinLoc location PDF. The second column shows the maximum likelihood location station positions and the source PDF for the solution constrained to be double-couple only. The third column shows the source PDF for the full moment tensor solution. The fourth and fifth columns show the marginalized distributions of the Hudson u and v parameters, respectively. Manually picked station first motions are given by red (up) or blue (down) markers, with darker points corresponding to more likely locations in the ray position distribution. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence and the Bayesian information criterion values are both given in Table 3.

DETAILED DESCRIPTION AND FURTHER OPTIONAL FEATURES

1 Overview

Embodiments of the present disclosure provide for characterizing properties of a fracture/fault from a probability estimation of an earthquake-source-type being double-couple and/or non-double-couple, using a probabilistic forward-model approach that rigorously incorporates known uncertainties.

In a hydraulic fracture operation, high pressure fluids are injected into a low permeability rock. Often, the fluids are injected through perforation holes in a cased borehole. The purpose of the injection is to open a fracture through the rock to create a high permeability path for the later flow of formation fluids, usually hydrocarbons, into the producing well. To keep the newly created fracture open, the injection fluids transport into the fracture a proppant, often rounded sand grains of a uniform size, which proppant prevents the fracture from closing once the injections pressure is released. During emplacement of the fracture, brittle rocks fail and release elastic energy in the form of propagating compressional (P) and shear (S) seismic waves. Each brittle rock failure is a small earthquake and is often called a microseismic event.

With sets of seismic detectors and recording equipment, and an understanding of the seismic wave propagation properties of the medium between the microseismic event and the detectors, the energy released by each microseismic event may be localized in space and time to identify where and when the event took place. Mapping the spatio-temporal evolution of the microseismic events allows the direction, height and extent of the hydraulic fracture to be evaluated.

The seismic energy recorded by the detectors may also be back-propagated to a notional unit sphere, called the focal sphere, around the microseismic event. The distribution of the P and S energy around the focal sphere is indicative of the type and geometry of rock rupture, and the amplitudes of the distribution are indicative of the rupture dynamics (size of rupture, rupture velocity, stress drop etc.). The amplitude distribution may be fully characterized by the six elements of the moment tensor, computable from the seismic observations and Green functions modelled for the medium between event location and the detectors.

Because underground stresses are high, most naturally occurring earthquakes occur as slip along a fault plane by shear failure. Such a rupture is called "double-couple" because the shear stress distribution in the rock just before failure has the form of two balanced force couples, separated by two orthogonal planes. At rupture, failure takes place along one of the two planes which must be identified using other information.

In a hydraulic fracture, pressure along the rupture plane is high and exceeds the fracture toughness of the rock. The rock fails by opening against the minimum horizontal earth stress and the fracture propagates parallel to the maximum horizontal stress, often in the form of multiple, discrete microseismic failure events, each of which may have elements of both double-couple and volumetric opening modes, possibly followed by closing modes as hydraulic pressure is released. To understand/manage the hydraulic fracturing process and/or characteristics of fractures/faults resulting from the hydraulic fracturing process, a quantitative estimate of the moment tensor components, together with an estimate of their uncertainties, may be used in order to characterize each microseismic rupture. Embodiments of the present disclosure provide for obtaining a quantitative estimate of the probability of an event being non-double-couple, including the different uncertainties on both the data and the earth model, because the most productive hydraulic fractures are those with the highest permeability created by the greatest opening between the rock walls bounding the fracture. Reliable analysis of the moment tensor in accordance with the present disclosure also enables mapping of those parts of the fracture that have been injected with proppant.

Determining (micro)-earthquake/microseismic source parameters from surface and/or borehole seismic observations is highly dependent on event location determination and the velocity model. Uncertainties in both the model parameters and the observations need to be rigorously incorporated into an inversion approach. These uncertainties include the background noise at the instrument, the receiver network geometry, the location uncertainty, uncertainty in the polarity of the seismic arrivals and the uncertainty in the velocity structure. A probabilistic forward-model approach can include these uncertainties by using marginalization over the uncertainty parameters. The forward model approach tests possible models against the data by computing synthetic observations for samples drawn from possible sources, which are then compared to the observed data, producing samples of the PDF.

In the forward model approach, different data types may be used, provided that the data measurements are independent. In embodiments of the present invention, different data types may be used by combining suitable probability distribution functions (PDFs) for the observations. These PDFs can be marginalized (integrated or summed) over the uncertainties, resulting in samples from a posterior PDF which includes the uncertainty information.

In most cases, especially for naturally occurring, long-range earthquakes, the moment tensor characterizing the source appears to be double-couple or close to double-couple, signifying slip along a fault plane. However, some non-double-couple mechanisms have been observed, such as those associated with nuclear explosions. Additionally, potentially non-double-couple mechanisms have been observed in events from volcanic and geothermal regions and other areas associated with induced seismicity, such as hydraulic fracturing. These non-double-couple mechanisms (e.g. event A in FIG. 19) may arise from processes involving a volumetric source or sink, such as an explosion, cavity or conduit collapse, or fracture opening, perhaps associated with magmatic dyke injection, or with fluid and/or proppant inflow during a hydraulic fracture operation.

A goal of microseismic monitoring of hydraulic fracture operations is to quantify the fracture opening or closing component of an event through moment tensor inversion. Quantification of fracture opening is desirable because fracture opening is necessary to emplace proppant in the fracture, which emplacement of proppant is itself necessary to maintain a high permeability conduit for fluid flow after hydraulic pressure is released.

More generally, knowledge of sub-surface processes derived using microseismic monitoring enables operations that involve the placement of material in the earth's sub-surface (for example, storage of carbon dioxide) and/or the extraction of material from the earth's sub-surface (for example, hydrocarbon extraction from a compartment of a reservoir) to become more effective. However, apparent non-double-couple characteristics can also be caused by uncertainties in the moment tensor inversion, such as noise in the data or velocity model uncertainties; elastic anisotropy in the source region, and the improved fit to noisy data due to the extra two parameters in the full moment tensor compared to the four parameters (orientation and magnitude) in a constrained double-couple source, in which the inverted solution is forced to be a double-couple.

By running the source parameter inversion constrained to the double-couple space and again in the full moment tensor space, posterior samples are generated for both of the different source models, although this could be added to any other source models, such as the crack+double-couple model. In embodiments of the present disclosure, the likelihood of the data given a specific source model, such as double-couple, can be evaluated for the different source models using Bayesian evidence. In embodiments of the present disclosure, this is calculated by marginalizing over the prior probabilities for the model parameters for the source type:

$$P(\text{data}|\text{model}) = \int P(\text{data}|x) P(x|\text{model}) dx$$

where: x represents the parameters of the specific source model type. If the appropriate PDFs are analytic, this expression can be evaluated directly, otherwise it is evaluated by summation over forward-modelled samples generated by a suitable sampling process, such as a Monte-Carlo process or the like.

In embodiments of the present disclosure, for discrete random samples, this can be formulated as a Monte Carlo integration, given an explicit form of a suitable PDF, although care needs to be taken to ensure a sufficient random sampling of the model space to evaluate this correctly.

In embodiments of the present disclosure, the model likelihoods can be converted to posterior probabilities for each model type using Bayes' theorem for some suitable prior PDF for the different model types:

$$P(\text{model}|\text{data}) P(\text{data}) = P(\text{data}|\text{model}) P(\text{model})$$

The resulting values can be normalized as the space of source models is complete, enabling a quantitative estimate of the relative probability of a non-double-couple source to a pure double-couple source. In embodiments of the present disclosure, this allows interpretation of the underlying physical processes, such as fracture growth.

This approach can be further extended to the source type in anisotropic materials by marginalizing over the anisotropy when inverting for the potency tensor, which is the contraction of the moment tensor with the compliance tensor of the medium local to the source.

Embodiments of the present disclosure provide for taking microseismic data recorded by a microseismic receiver during a hydraulic fracturing operation and converting this data into an understanding/image of the fractures/faults during/after the hydraulic fracturing operation. This provides for managing the hydraulic fracturing process and/or understanding the properties of the fractures/faults and/or proppant placement resulting from the hydraulic fracturing. In turn, in some aspects, the knowledge of the fractures/faults and/or proppant placement resulting from the hydraulic fracturing may be used in modeling of hydrocarbon production through the faults/fractures. This modeling may result in further hydraulic fracturing operation. Moreover the knowledge of the properties of the fractures/faults and/or proppant placement may be used in further hydraulic fracturing operation. Processing microseismic data to generate an image/understanding of the rock structure/characteristics resulting from hydraulic fracturing provides for understanding/managing both hydrocarbon production and/r the hydraulic fracturing operation.

Embodiments of the present disclosure provide for: using the posterior distributions marginalized over uncertainties for different source model types to estimate the posterior source model probabilities using the Bayesian evidence and suitable prior probabilities. The resultant probabilities can be used to quantify the probability of the event being a source with an opening or closing component or just slip on a fault plane.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

2 Bayes' Theorem and Probabilities

Inversion methods aim to find the best fitting model parameters for the given data. In the case of source inversion, the probability of obtaining the data is evaluated for the possible sources. The resulting estimates of the probability density function (PDF) can be combined for all the data to approximate the true PDF for the source. This PDF describes the likelihood of observing the data for a particular source given the model, p(data|model). However, the value of interest in such an inversion is the probability of the model given the observed data, the posterior PDF. This can be evaluated from the likelihood using Bayes' Theorem (Bayes & Price 1763; Laplace 1812; Sivia 2000):

$$p(\text{model}|\text{data}) = \frac{p(\text{data}|\text{model})p(\text{model})}{p(\text{data})}. \quad (4)$$

Bayes' theorem links the two PDFs using prior probabilities. This incorporates the prior known information for the data, and can be used to include known constraints such as fault geometries or source type. Quantifying the prior state of knowledge for a system is often not trivial, and Bayes' theorem states that any assumptions made when formulating the prior will be directly reflected in the posterior PDF (Sivia 2000, Chapter 2). Although a commonly used prior is the null prior, which is a uniform distribution and does not change the posterior from the likelihood.

The normalized full moment tensor has five independent components, compared to three in the normalized double-couple tensor. These extra free parameters provide an improved fit, for example, to both data and noise. However, the commonly held view is that most earthquakes are double-couple, so a possible choice of prior could reduce the tendency for full moment tensor inversions to over-fit double-couple solutions, without taking the step of forcing the solution to be double-couple.

TABLE 1

Some uncertainties that affect source inversion and their origins.

| Uncertainty | Description |
| --- | --- |
| Velocity model | Used throughout an inversion, poor choice of model can lead to large errors |
| Pick time | Depends on instrument timing errors, background noise and human subjectivity |
| Instrument and background noise | Noise affects all the observations |
| Hypocentre | Dependent on velocity model used and pick times |
| Polarity | Dependent on pick time, instrument orientation error, and background noise |
| Instrument location | Affects positioning on the focal sphere for a given hypocentre and model |
| Instrument coupling and site effects | Affects measured seismic wave amplitudes |
| Instrument orientation | Errors in orientation of instrument components impact many measurements |
| Source angle error | Dependent on hypocentre, instrument location and velocity model |

3 Uncertainties and Marginalization

Source inversion is particularly sensitive to uncertainties and, because it is usually carried out after several other necessary steps, the effect of the uncertainties may be difficult to understand. The uncertainties can be broken down into several different types: instrument errors, model errors, and background noise. Table 1 shows some of the error types and their origins, although there is an additional source of uncertainty arising from an inability to resolve all the model parameters given the available data.

Although interdependencies between the uncertainties can be explored, no quantitative relationship is known. For such a treatment to be truly rigorous, the variations in these errors must be included throughout the inversion.

The Bayesian formulation allows rigorous inclusion of uncertainties in the problem using marginalization (Sivia 2000, section 2.3). Marginalization removes the dependence of the joint PDF, p(A, B), on one of the variables by integrating over the PDF for that variable:

$$p(A) = \int p(A, B)dB = \int p(A|B)p(B)dB. \quad (5)$$

Consequently, marginalization can be used to reduce the PDF to a form that is dependent only on the parameters of interest, while taking all the uncertainties into account.

To incorporate the measurement errors in the inversion, for example, it is necessary to produce a PDF for the error ($\Delta_{mes}$) over which to marginalize. The assumption made for the background noise is that the mean and variance are measurable and, therefore, the most ambiguous (maximum entropy) distribution for these measurements is the Gaussian distribution, as can be shown using variational calculus (Appendix B). For de-meaned data, the background noise can be assumed also to have zero mean, and a standard deviation $\sigma_{mes}$, so that the PDF is:

$$p(\Delta_{mes}) = \frac{1}{\sqrt{2\pi\sigma_{mes}^2}} e^{-\frac{\Delta_{mes}^2}{2\sigma_{mes}^2}}. \quad (6)$$

Location and velocity model uncertainties can have significant effects on the source. A common location method for microseismic events is NonLinLoc (Lomax et al. 2000, 2009), which produces samples from the source location PDF. Velocity model uncertainty can be included in that method by marginalizing the location PDF with respect to the velocity models. These approaches can therefore be used to incorporate location and velocity model uncertainty in the source inversion approach as described below.

4 Inversion Approach

The inversion approach described here is designed for microseismic events. In many cases where microseismic events are recorded, it would be difficult and time consuming to calculate the Green functions for all the events due to poorly constrained velocity models and event locations that often vary across the network, increasing the number of calculations. Furthermore, velocity variation has a larger effect on the ray paths due to the close proximity of the receivers to the source, unlike the teleseismic case. The approach of the present invention aims to produce a robust result for the moment tensor, which includes known uncertainties in the measurements. The approach has been tested with polarity and amplitude ratio data, and can easily be extended to other possible data types such as amplitude and the full-waveform fitting, provided a suitable PDF can be described relating the source to the data and the uncertainties.

A necessary caveat when performing any inversion is that any dependence in the data must be accounted for. For example, if combining P-, SH-, and SV-amplitude measurements into amplitude ratios, the ratios used must be independent, so from three measurements it is possible to construct only two independent ratios.

The uncertainties, both in the polarity and amplitude ratio measurements and in the model parameters are included in the source PDF using Bayesian marginalization (see above). This requires an estimate of the PDFs for the different uncertainties, either from estimates on the measurements or from direct sampling of the associated PDF if it is known (e.g. location). Often a Gaussian uncertainty is assumed as the uncertainty PDF, but this may be incorrect, leading to systematic errors in the resultant PDFs.

TABLE 2

Inversion parameters.

| Symbol | Parameter |
|---|---|
| Y | Observed polarities |
| R | Observed amplitude ratios |
| τ | Pick arrival times |
| x | Event location |
| A | Theoretical amplitudes |
| σ | Observed measurement errors |
| $\sigma_T$ | Pick arrival time uncertainties |
| ω | Probability of reversed trace |
| a | Station angle six-vector |
| M | Moment tensor |
| G | Earth model |
| s | Station locations |

4.1 Posterior PDF

A probabilistic approach to source inversion requires an approximation to the posterior PDF for the source parameters, $p(M|d, k)$. The parameters used in this section are summarized in Table 2. The posterior PDF depends on the observations, $d=(d', \tau)$, the unknown nuisance parameters that are marginalized over, $\epsilon=(\epsilon', x)$, where $\epsilon'=(A, \sigma, \omega)$, and the known parameters, $k=(s, \sigma_\tau, G)$.

Bayes' theorem (eq. 4) allows us to rewrite the posterior PDF in terms of the likelihood of the data and the model prior:

$$p(M|(d,k) \propto p(d|M,k)p(M). \qquad (7)$$

Expanding the observations, d, into those used for the source mechanism inversion, d', and the phase arrival times, τ, gives:

$$p(M|d',\tau,k) \propto p(d'|M,\tau,k)p(M), \qquad (8)$$

which is dependent on the likelihood of the source type observations, $p(d'|M, \tau, k)$. This likelihood is a joint distribution over the observed data used for constraining the source, and can be separated into the product over the set of N receivers with observation, because the measurements at a receiver are independent of the others:

$$p(d'|M, \tau, k) = \prod_{i=1}^{N} p(d'_i|M, \tau_i, k_i), \qquad (9)$$

where the i subscript indicates the coordinates for receiver i. Unfortunately the data likelihood is dependent on the nuisance parameters, so to obtain eq. (9), the nuisance parameters, $\epsilon$, must be marginalized (eq. 5) over:

$$p(d'|M, \tau, k) = \int \prod_{i=1}^{N} [p(d'_i|M, \tau_i, \epsilon_i, k_i)] p(\epsilon|M, \qquad (10)$$

where the product corresponds to the product of the data PDFs over each receiver. The nuisance parameters can be expanded using the product rule for conditional probabilities:

$$p(a,b,c) = p(a|b,c)p(b|c)p(c) \qquad (11)$$

The nuisance parameter components are: $\epsilon'$, which includes the modelled amplitudes and data uncertainties, and the location x. This gives:

$$p(d'|M, \tau, k) = \qquad (12)$$

$$\int\int \prod_{i=1}^{N} p(d'_i|M, \tau_i, \epsilon'_i, x, k_i)p(x|M, \tau, \epsilon', k)p(\epsilon'|M, \tau, k)dx, d\epsilon'.$$

However, the observations, $d'_i$, depend only on $\epsilon'$ and the pick times, while the location, x, depends only on the arrival times, τ, and the known parameters, k. Therefore, the likelihood can be simplified to:

$$p(d'|M, \tau, k) = \qquad (13)$$

$$\int\int\int \prod_{i=1}^{N} \left[\int p(d'_i|A_i, \sigma_i, \omega_i, \tau_i)p(A_i|x, M)dA_i\right] p(x|\tau, k)$$

$$p(\sigma)p(\omega)dxd\sigma d\omega.$$

Expanding for the nuisance variables in $\epsilon'$ using the product rule and splitting these variables into the receiver dependent and independent parameters gives:

$$p(d'|M, \tau, k) = \qquad (14)$$

$$\int\int\int \prod_{i=1}^{N} \left[\int p(d'_i|A_i, \sigma_i, \omega_i, \tau_i)p(A_i|x, M)dA_i\right] p(x|\tau, k)$$

$$p(\sigma)p(\omega)dxd\sigma d\omega.$$

The likelihood of observing the data given the source model parameters, the time picks and associated uncertainties, the station locations and the velocity model is marginalized over four nuisance parameters: the theoretical amplitude probability, $p(A_i|x, M)$, which is dependent on the location and the model parameters; the location PDF, $p(x|\tau, k)$; the probability of obtaining the observed measurement errors for the polarities and amplitude ratios, $p(\sigma)$; and the probability of an instrument trace reversal, $p(\omega)$.

The theoretical amplitude probability can be written in terms of the dot product between the station propagation coefficients and the moment tensor six-vector, $a_i \cdot \tilde{M}$, where the station propagation coefficients depend on the location, x. The PDF for the amplitude for a given source location, $x_j$, is dependent only on that location, so is given by a delta function, $\delta(A_i - a_{i,j} \cdot \tilde{M})$, where $a_{i,j} = a_i(x_j)$ refers to the station propagation coefficients for the receiver i, associated with the location at $x_j$:

$$p(d'|M, \tau, k) = \qquad (15)$$
$$\int\int\int \prod_{i=1}^{N} \left[\int p(d'_i|A_i, \sigma_i, \omega_i, \tau_i) \delta(A_i - a_{i,j} \cdot \tilde{M}) dA_i\right]$$
$$p(x = x_j|\tau, k) p(\sigma) p(\omega) dx d\sigma d\omega$$

Integrating over the delta function (eq. 57) is equivalent to evaluating the theoretical amplitude associated with the location:

$$p(d'|M, \tau, k) = \qquad (16)$$
$$\int\int\int \prod_{i=1}^{N} p(d'_i|A_i = a_{i:j} \cdot \tilde{M} \cdot \sigma_i, \omega_i, \tau_i) p(x = x_j|\tau, k)$$
$$p(\sigma) p(\omega) dx d\sigma d\omega$$

The integral over the location uncertainty is not analytic but can be evaluated using a Monte Carlo approach by summing over M hypocentre samples drawn from the location PDF, $p(x=x_j|\tau, k)$:

$$p(d'|M, \tau, k) = \qquad (17)$$
$$\int\int \sum_{j=1}^{M} \prod_{i=1}^{N} p(d'_i|A_i = a_{i:j} \cdot \tilde{M}, \sigma_i, \omega_i, \tau_i) p(\sigma) p(\omega) d\sigma d\omega$$

Eq. (17) includes the location uncertainty in the PDF by converting the integral over dx to a sum over the location PDF samples.

Following Walsh et al. (2009), the likelihood for a case with an unknown earth model differs from the known earth model case (eq. 17). It has an additional Monte Carlo integration over the possible velocity models, with the station propagation coefficients now dependent on the location, x, and the earth model, G, where $a_{i,jk} = a_i(x_j, G_k)$ refers to the station propagation coefficients associated with a location at $x_j$ and an earth model $G_k$. For Q earth models and M locations, there are Q×M location and velocity model samples to sum over to carry out the marginalization:

$$p(d'|M, \tau, k) = \qquad (18)$$
$$\int\int \sum_{k=1}^{Q} \sum_{j=1}^{M} \prod_{i=1}^{N} p(d'_i|A_i = a_{i:jk} \cdot \tilde{M}, \sigma_i, \omega_i, \tau_i) p(\sigma) p(\omega) d\sigma d\omega$$

Assuming the measurements are independent, the data likelihood at receiver i, $p(d'_i|Ai = a_{i,jk} \cdot \tilde{M}, \sigma_i, \omega_i, \tau_i)$ can be expanded as the product of the different PDFs observation types (Sivia 2000, section 4.5). Sections 4.2 and 4.3 below define specific PDFs for the polarity, $p(Y_i|Ai = a_{i,jk} \cdot \tilde{M}, \sigma_i, \omega_i, \tau_i)$, and amplitude ratios $p(R_i|Ai = a_{i,jk} \cdot \tilde{M}, \sigma_i, \tau_i)$, giving:

$$p(d_i'|A_i = a_{i,jk} \cdot \tilde{M}, \sigma_i, \omega_i, \tau_i) = p(Y_i|A_i = a_{i,jk} \cdot \tilde{M}, \sigma_i, \omega_i, \tau_i) p(R_i|A_i = a_{i,jk} \cdot \tilde{M}, \sigma_i, \tau_i). \qquad (19)$$

There is no dependence on the trace reversal probability, $\omega_i$, in the amplitude ratio likelihood because the observations are unsigned, so are unaffected.

$p(\sigma)$ and $p(\omega)$ are the chosen priors for the measurement uncertainties and the probability of instrument trace reversal respectively. It is possible to remove any dependence on the trace reversal probability, $\omega_i$, by using observations from a source with a known mechanism (e.g. a teleseismic earthquake) to calibrate the trace orientation. So the trace reversal probability in eqs (27) and (59) would be either 0 or 1, or more usefully, any incorrect traces could be inverted so that $\omega_i = 0$ for all stations.

The likelihoods for a known velocity model (eq. 17) and unknown velocity models (eq. 18) have been defined in some detail. The equations include uncertainties in the observations, the location, with all of its associated uncertainties, and the probability of a trace reversal. The source model distribution is fully described by the posterior PDF, p(M|d, k), which can be evaluated by multiplying the likelihood (eqs 17 and 18) with the chosen source prior.

4.2 Polarity PDF

Figure 1:
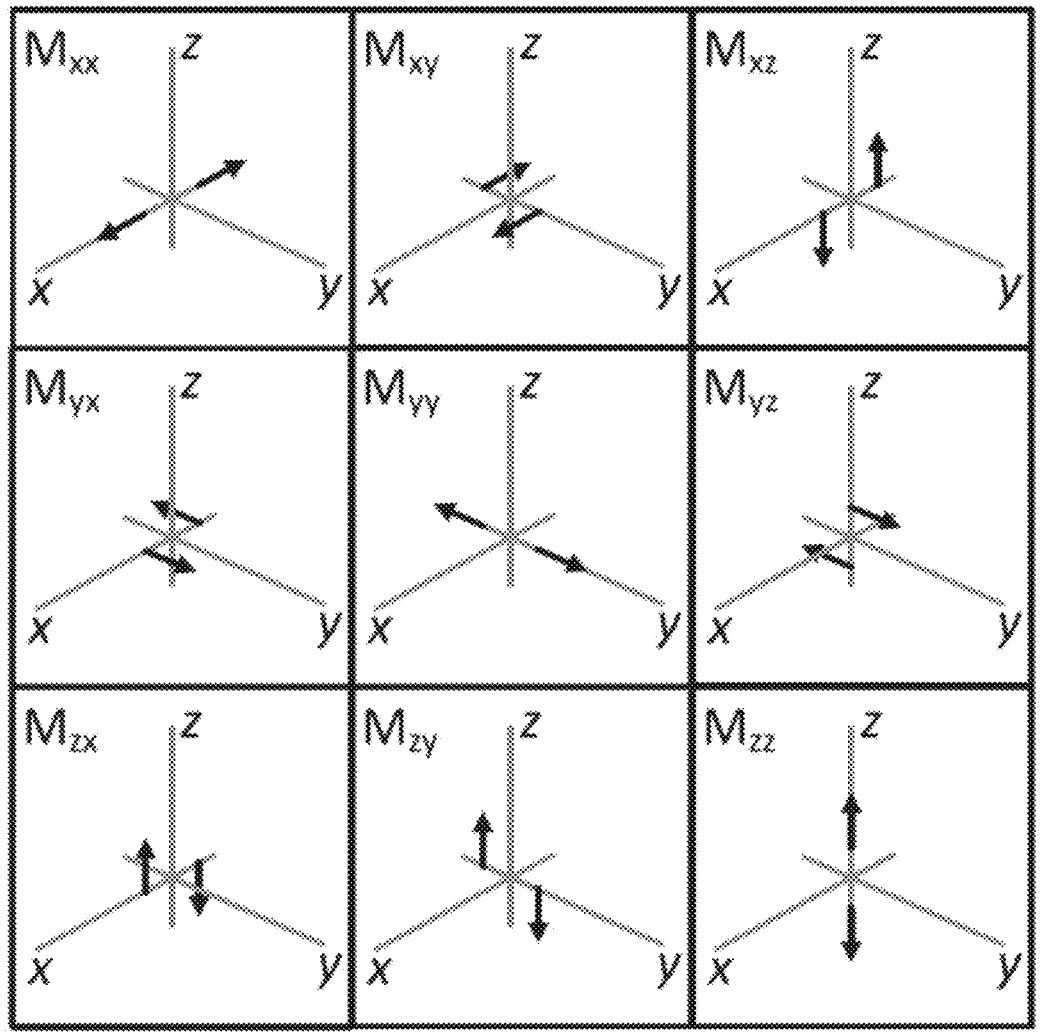
FIG. 1. Force couple description of a moment tensor following Aki & Richards (2002, p 51). Force couples are used so that linear momentum is conserved. To conserve angular momentum, it is necessary to constrain the tensor to be symmetric.
Figure 2:
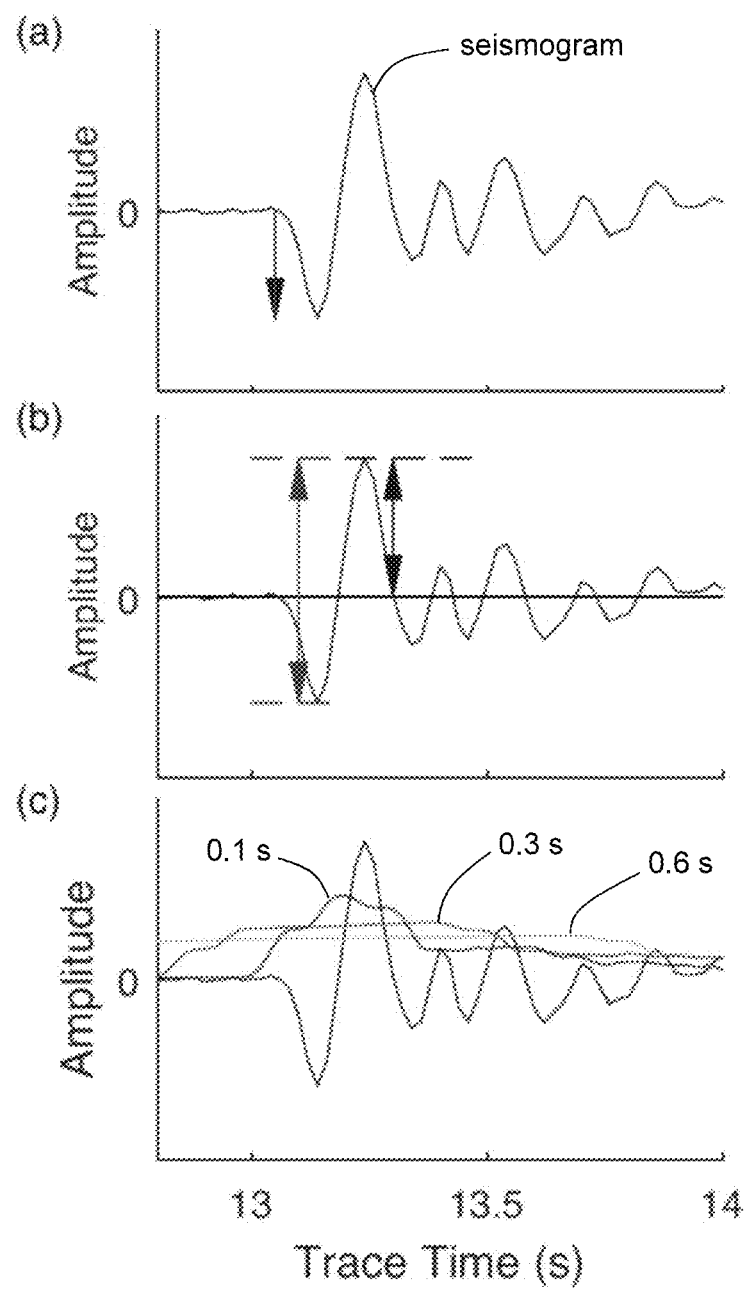
FIG. 2. Examples of different measurements. The seismogram examples are a synthetic waveform example. In (a), the arrow shows the direction of the first motion polarity of the arrival. (b) shows the peak-to-peak (longer doubled headed arrow) and maximum value (shorter doubled headed arrow) amplitude measurements. (c) shows the windowed root-mean-squared value over three different central windows: 0.1 s, 0.3 s and 0.6 s, overlain on the seismogram.

The first-arrival polarity is a commonly used measurement for constraining source inversion (e.g. Reasenberg & Oppenheimer 1985; Hardebeck & Shearer 2002; Snoke 2003), and is measured as the direction of the first peak of the arrival waveform at a receiver (FIG. 2a). It is dependent on correct determination of the arrival onset, as well as a clear impulsive arrival characteristic.

The PDF for polarity, Y, given a polarity observation, y, at an instrument for a given theoretical amplitude, A, is given by a step function such as the Heaviside step function.

$$H(x) = \int_{-\infty}^{x} \delta(s) ds. \qquad (20)$$

This PDF is dependent on the error in the amplitude, $\Delta_Y$,
$$p(Y = y|A, \Delta_Y) = H(y(A + \Delta_Y)). \qquad (21)$$

Marginalizing eq. (21) over $\Delta_Y$, for a given standard deviation, $\sigma_Y$, using a Gaussian noise model (eq. 6) gives:

$$p(Y = y|A, \sigma_Y) = \int_{-\infty}^{\infty} p(Y = y|A, \Delta_Y) p(\Delta_Y|\sigma_Y) d\Delta_Y, \qquad (22)$$

$$p(Y = y|A, \sigma_Y) = \int_{-\infty}^{\infty} H(yA + y\Delta_Y) \frac{1}{\sqrt{2\pi\sigma_Y^2}} e^{-\frac{\Delta_Y^2}{2\sigma_Y^2}} d\Delta_Y. \qquad (23)$$

The product $y\Delta_Y$ changes the sign of the noise to reflect the polarity, but because the PDF for $\Delta_Y$ is symmetric about 0, this change in sign has no effect. Eq. (23) can be integrated using this behaviour of the step function:

$$\int_{-\infty}^{\infty} H(x + \Delta) f(\Delta) d(\Delta) = \int_{-x}^{\infty} f(\Delta) d(\Delta). \qquad (24)$$

So, eq. (23) can be rewritten as:

$$p(Y = y|A, \sigma_Y) = \int_{-yA}^{\infty} \frac{1}{\sqrt{2\pi\sigma_Y^2}} e^{-\frac{\Delta_Y^2}{2\sigma_Y^2}} d\Delta_Y, \qquad (25)$$

which due to the symmetry of the normal distribution about the mean, results in:

$$p(Y=y|A,\sigma_Y) = \int_{-\infty}^{yA} \frac{1}{\sqrt{2\pi\sigma_Y^2}} e^{-\frac{\Delta_Y^2}{2\sigma_Y^2}} d\Delta_Y = \frac{1}{2}\left(1+\text{erf}\left(\frac{yA}{\sqrt{2}\sigma_Y}\right)\right), \quad (26)$$

with the Gauss error function defined as $$\text{erf}(x) = \frac{2}{\sqrt{\sigma}} \int_0^\lambda e^{-t^2} dt.$$

However there is also a possibility that a manufacturing or user error has occurred and the instrument is incorrectly wired, such that the trace is inverted. Consequently, the PDF for a given polarity is also dependent on the probability of such a trace inversion occurring, ω:

$$p(Y=y|A,\sigma_Y,\omega) = \qquad (27)$$
$$\frac{1}{2}\left(1+\text{erf}\left(\frac{yA}{\sqrt{2}\sigma_Y}\right)\right)(1-\omega) + \frac{1}{2}\left(1+\text{erf}\left(\frac{-yA}{\sqrt{2}\sigma_Y}\right)\right)\omega.$$

This polarity PDF is consistent with that shown by Brillinger et al. (1980) and Walsh et al. (2009).

Because the moment tensor six-vector is normalized, the modelled amplitude can therefore take values between −1 and 1. The polarity standard deviation, $\sigma_Y$, is related to the amplitude uncertainty compared to the maximum theoretical amplitude at the station (based purely on the event magnitude, source-to-station propagation and receiver coupling). However, this is difficult to calculate, especially for events with poor focal sphere coverage.

Walsh et al. (2009) call $\sigma_Y$ the noise for the arrival, but this does not scale correctly in comparison to the modelled amplitude due to the propagation effects. They treat it as a user-determined value, representing the confidence in the arrival. $\sigma_Y$ could be estimated from the fractional amplitude uncertainty, but this will be greater than or equal to the true value, because the amplitude at a receiver is only ever less than or equal to the maximum theoretical amplitude (accounting for propagation effects). Therefore, this would most likely overestimate the uncertainty. It is clear that the uncertainty value should be station-specific because noise environments at different stations often vary, so the maximum estimate of the event signal-to-noise ratio (SNR) fails to account for the variation across the receivers.

The difficulty in estimating the uncertainty is increased further when polarity picking is done manually, so the uncertainty on the trace is perhaps not known. Due to the difficulty in quantifying the uncertainty, it is best left as a user-defined parameter, as Walsh et al. (2009) do, that reflects the confidence in the arrival polarity pick, which can be mapped to the pick quality. However, Pugh et al. (2016) propose an alternate method for calculating polarity uncertainties that can be included in this framework.

4.3 Amplitude Ratio PDF

The amplitude ratio is more complex than the polarity, and there are different approaches to the measurement (FIGS. 2b and c), each of which can have different effects (Section 4.3.1). Moreover, as the uncertainty in the amplitude measurement is usually modelled as a Gaussian, the uncertainty in the amplitude ratio cannot also be Gaussian, but is more complex (Section 4.3.2). This results in a non-Gaussian amplitude ratio likelihood (Section 4.3.3).

The modelled amplitude ratio is dependent on the theoretical amplitudes, $A_P$, $A_{SH}$ and $A_{SV}$. Each amplitude observation has a measurement uncertainty, and the uncertainty of the ratio is not simply the ratio of the amplitude uncertainties. The PDF for a given ratio observation vector $r=(r_{SH}{}^P, r_{SV}{}^P)$ at an instrument with given theoretical amplitudes $A_P$, $A_{SH}$ and $A_{SV}$ is 2-D. However, because the observations are independent, the PDFs are independent and, therefore, the PDFs for each ratio can be multiplied together to give the total PDF for the ratios.

Considering a single observed ratio r=x/y and theoretical amplitudes $A_X$ and $A_Y$, the PDF for the ratio is given by the delta function δ(x), although this is again dependent on the measurement error of the two observations $\Delta^X$ and $\Delta^Y$:

$$p\left(r=\frac{x}{y}\Big|A_X,A_Y,\Delta^X,\Delta^Y\right) = \delta\left(\frac{A_X+\Delta^X}{A_Y+\Delta^Y}-\frac{x}{y}\right). \quad (28)$$

4.3.1 Measuring the Amplitude Ratio

There are several approaches for measuring the amplitude of a seismic arrival. The simplest approach is to take the maximum absolute value $(A_{max})$ from the arrival window. However, the maximum peak-to-peak amplitude $(A_{PP})$ has a higher SNR for uncorrelated noise (FIG. 2b). A logical extension of the peak-to-peak approach is the root-mean-square (RMS) amplitude of samples within the arrival window $(A_{RMS})$ (FIG. 2c) because it reduces the dependence of the observation on the (uncorrelated) noise further by a factor dependent on the window length n, $$\sigma_{RMS} \propto \frac{\sigma}{\sqrt{n}}. \quad (29)$$

However, the choice of window length is important because the arrival is finite; therefore, extending the RMS window a long way beyond the noise reduces the effect of the signal by a similar factor of √n. As a consequence, it can be difficult to compare RMS observations for different window lengths.

Figure 3:
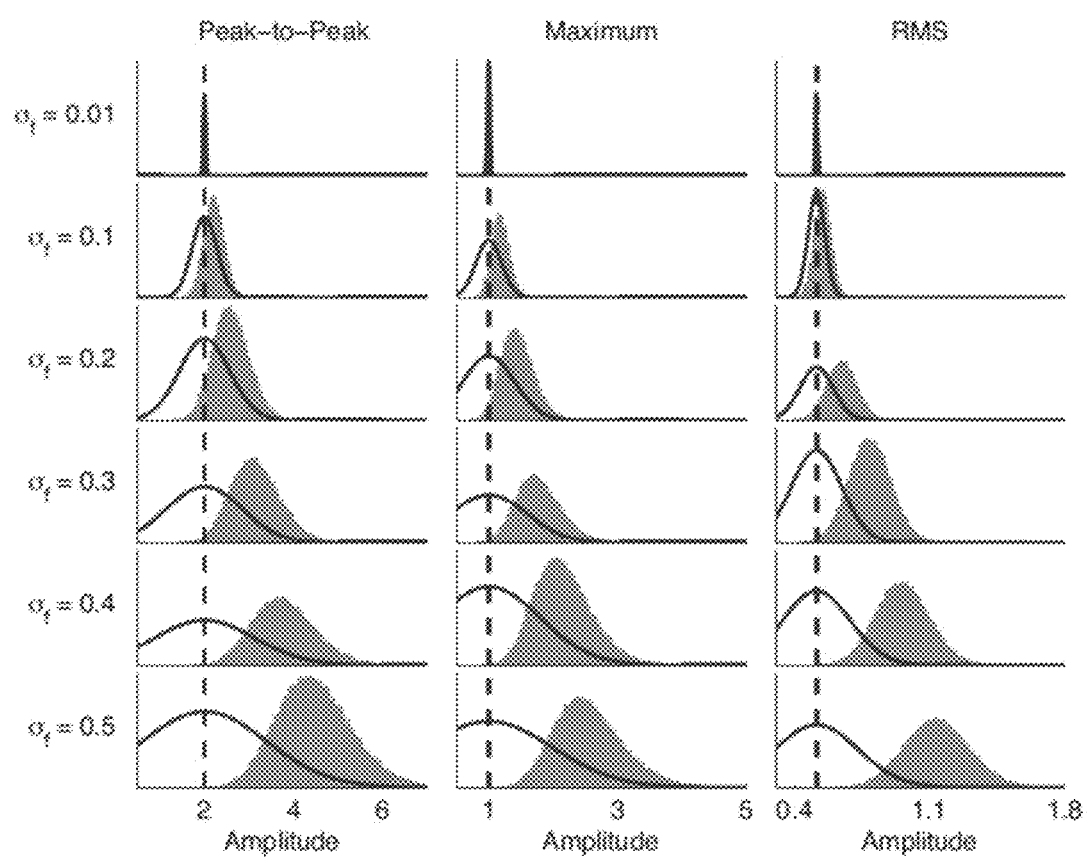
FIG. 3. Histogram of amplitude measurement distributions (in grey) for different fractional noise levels, $\sigma_f$, using different measurement approaches. The vertical dashed lines are the true amplitude values, and the solid lines are the assumed Gaussian distributions for the given uncertainty. The fractional noise corresponds to the inverse of the true SNR value. The vertical scales are independent between the plots because the amplitude distributions are normalized so that the area integral is 1.
Figure 4:
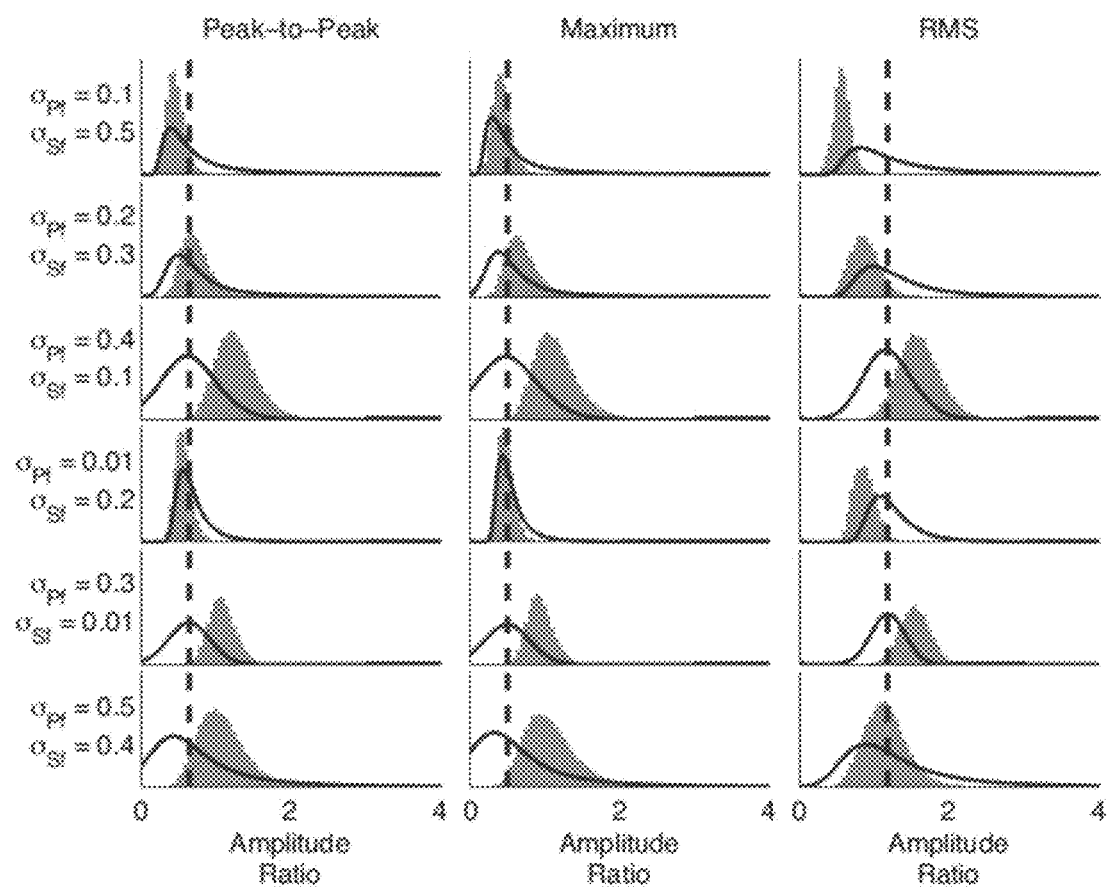
FIG. 4. Histogram of amplitude ratio distributions (in grey) with differing fractional noise levels for the P, $\sigma_{P,f}$ and S, $\sigma_{S,f}$ arrivals using different measurement approaches. The vertical dashed lines correspond to the correct values and the solid lines are the assumed distributions of the observed ratios given the correct amplitudes and uncertainties, corresponding to the ratio PDF as defined in Section 4.3.2. The fractional noise corresponds to the inverse of the true SNR value. The vertical scales are independent between the plots because the amplitude ratio distributions are normalized so that the area integral is 1.

The choice between these different approaches is, therefore, not straightforward. Additionally, the presence of noise on an arrival complicates the matter. The noise leads to an increasing difference from the true value of the amplitude, as shown in FIG. 3. This figure shows the results of a synthetic test of the distribution of amplitude measurements for a synthetic arrival with known amplitude and different levels of Gaussian noise added. The mean of the empirical distribution increases as the noise level increases, moving away from the true value of the arrival amplitude given by the broken vertical lines and the corresponding Gaussian distributions. While a correction could be applied to the mean of the distribution to return it to the true value, the value is dependent on both the noise and the arrival, making it impractical. The width of the distribution also increases as expected, although less than the modelled value from the Gaussian distribution. This deviation from the true value is due to amplitude measurements being determined by the extrema in the arrival. They will therefore tend to increase as the noise increases. If the arrivals of different phases have disparate noise levels, it can cause large deviations from the expected distribution in the ratio (eq. 59), as shown in FIG. 4. The deviation in the amplitude ratio distribution from the expected distribution is greatest when the difference in the fractional noise (inversely proportional to the true SNR) is largest, especially if the larger value is in the numerator. If the model source parameters reproduce the true amplitude ratio of the arrivals, this systematic deviation in the observed values due to the noise can reduce the probability of obtaining the correct source parameters, potentially leading to incorrect results (discussed further in Section 6).

Hardebeck & Shearer (2003) found that S-wave/P-wave amplitude ratio uncertainties may be large due to noise and site effects, and are sometimes not effective in improving well-constrained solutions. FIG. 4 shows that the choice of amplitude estimate can have an effect and, although the variation in the distributions of $A_{max}$ and $A_{PP}$ is small and there is little difference between the two, there can be large differences between $A_{max}$ and $A_{RMS}$.

The amplitude observations must be consistent between different receivers, which can be complicated by the different coupling of the receiver components to the ground. This coupling varies between receivers, creating the need for an additional correction.

4.3.2 Amplitude Ratio Noise Model

The observed amplitude ratio does not simply relate to the ratio of the modelled amplitudes, but it is dependent on a propagation correction, Z (Aki & Richards 2002, cf. Chapter 4, eq. 4.97):

$$R_{SH}^P = \frac{A_P}{ZA_{SH}}. \tag{30}$$

While this is unity for S amplitude ratios, the coefficient depends on the velocity ratio between the different phases involved.

The simplest form of the propagation correction, assuming constant $V_P/V_S$ ratio along the ray path, is given by:

$$Z = (V_P/V_S)^3. \tag{31}$$

Figure 5:
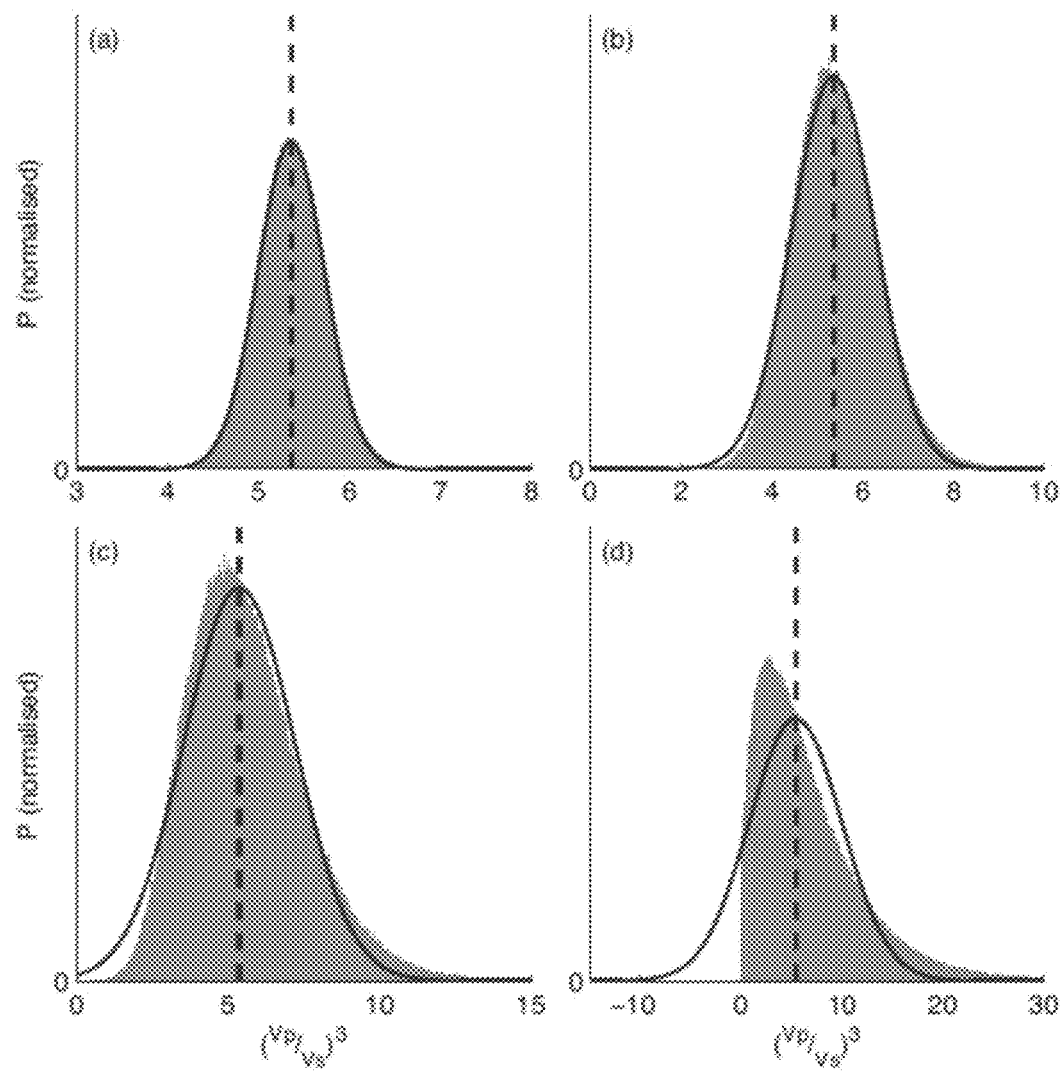
FIG. 5. Histograms of the propagation correction (eq. 31) distributions (in grey) assuming Gaussian error on $V_P/V_S$. The solid lines correspond to $\mathcal{N}(Z, \mu_Z, \sigma_Z)$ calculated according to eqs (32) and (33). The dashed vertical lines correspond to $\mu_Z$, and the histograms show the actual distributions calculated from 1 000 000 samples from Gaussian distributions for $V_P/V_S$ with $\mu_{V_P/V_S}=1.75$. The standard deviation was varied, taking values of (a) $\mu_{V_P/V_S}=0.04$, (b) $\mu_{V_P/V_S}=0.1$, (c) $\mu_{V_P/V_S}=0.2$, and (d) $\mu_{V_P/V_S}=0.5$. The vertical scales are independent between the plots because the amplitude distributions are normalized so that the area integral is 1.

Assuming a Gaussian uncertainty for the $V_P/V_S$ ratio, it becomes necessary to determine the distribution of the propagation coefficient (FIG. 5). The mean and standard deviation are given by:

$$\mu_Z = \mu_{V_P/V_S}^3, \tag{32}$$

$$\sigma_Z = 3(V_P/V_S)^2 \sqrt{\sigma_{V_P/V_S}^2}, \tag{33}$$

where $\sigma_Z$ can be determined from the Taylor expansion of the correction function:

FIG. 5 shows that a Gaussian distribution is a good approximation to the true distribution of values, provided that the percentage uncertainty on the $V_P/V_S$ ratio is small compared to the ratio ($\mu_{V_P/V_S} \gtrsim 9\sigma_{V_P/V_S}$). The $V_P/V_S$ percentage uncertainty is typically small, so the Gaussian noise model is a valid model to use. Fractional uncertainties within 0.2 often encompass all the uncertainty in the Wadati plot of S-to-P delay times versus P-arrival time (Wadati 1933; Wadati & Oki 1933).

However, instead of applying the correction to the modelled S-amplitude, it can be applied to the observed P-amplitude, as in this case. The corrected P-amplitude can be approximated by a Gaussian distribution, with mean and standard deviation given by $$\mu_{A_{P'}} = \mu_Z * \mu_{A_P}, \tag{34}$$

$$\sigma_{A_{P'}} = \sqrt{A_P^2 \sigma_Z^2 + Z^2 \sigma_{A_P}^2}. \tag{35}$$

Figure 6:
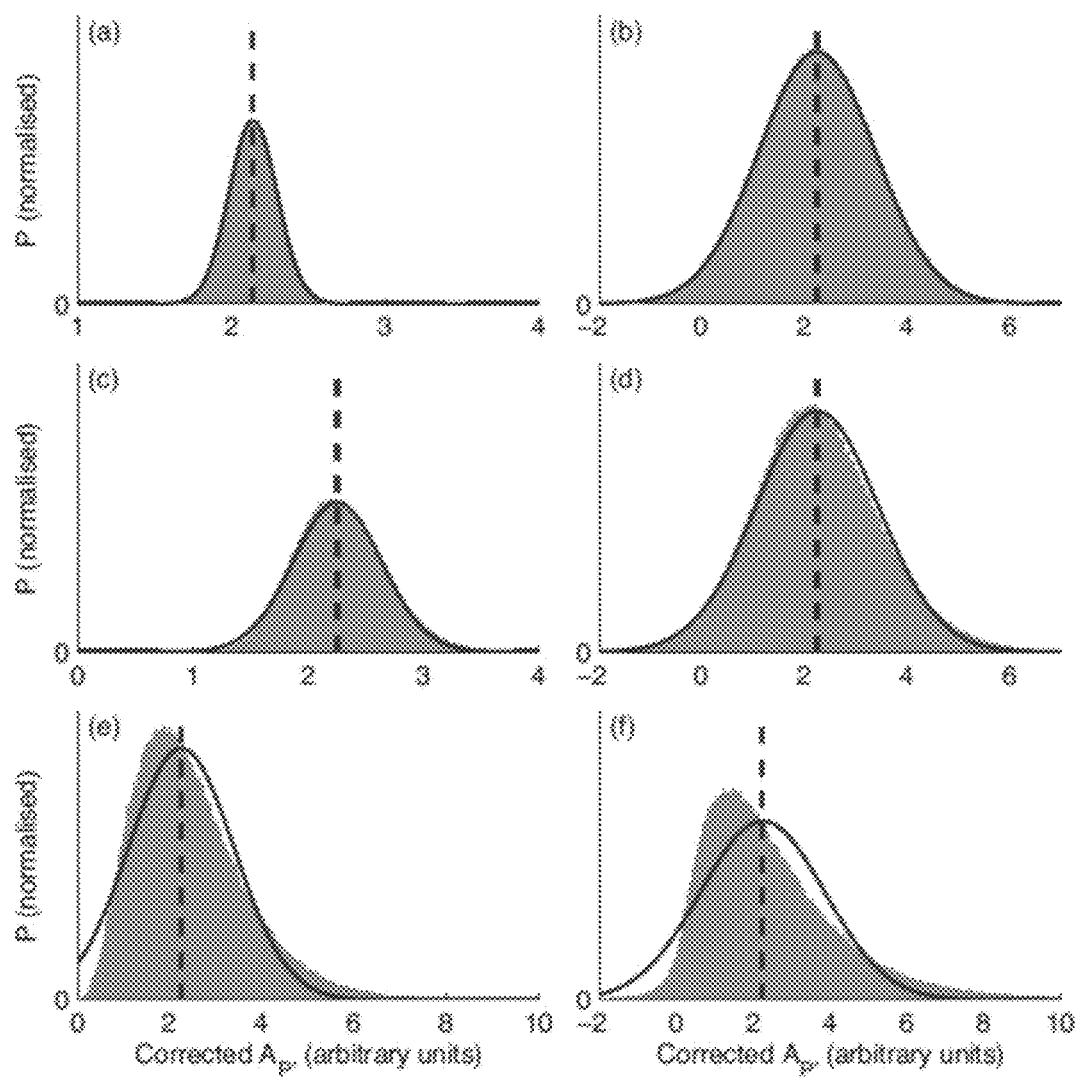
FIG. 6. Histograms of the propagation corrected model P amplitude $A_{P'}$ distributions (in grey). The solid lines correspond to $\mathcal{N}(A_{P'}, \mu_{A_{P'}}, \sigma_{A_{P'}})$ calculated according to eqs (34) and (35). The dashed vertical lines correspond to $\mu_{A_{P'}}$, and the histograms show the actual distribution calculated from 1 000 000 samples from Gaussian distributions for $A_P$ and $V_P/V_S$ with $\mu_{V_P/V_S}=1.75$. The left column shows the distributions for a P amplitude SNR=40, the right column SNR=2. (a) and (b) $\sigma_{V_P/V_S}=0.04$, (c) and (d) $\sigma_{V_P/V_S}=0.1$, and (e) and (f) $\sigma_{V_P/V_S}=0.3$. The vertical scales are independent between the plots as the amplitude distributions are normalized so that the area integral is 1.

FIG. 6 shows the distributions of the corrected P-wave amplitudes, evaluated for a range of $V_P/V_S$ uncertainties and noise levels. For small $V_P/V_S$ uncertainties, the distribution is approximately Gaussian. However, as the uncertainty increases it becomes skewed, although the region where the Gaussian approximation fails is higher than the expected $V_P/V_S$ uncertainties.

It is possible to describe the amplitude ratio in terms of two parameters: the mean and standard deviation, given by $$\mu_R = \frac{\mu_Z \mu_{A_P}}{\mu_{A_{SH}}} = \frac{\mu_{A_{P'}}}{\mu_{A_{SH}}}, \tag{36}$$

$$\sigma_R = R_{SH}^P \sqrt{\frac{\sigma_P^2}{A_P^2} + \frac{\sigma_{SH}^2}{A_{SH}^2} + \frac{\sigma_Z^2}{Z^2}}. \tag{37}$$

In this case, the maximum entropy distribution is the Gaussian distribution (Appendix B).

These two parameters describe a possible Gaussian model for the amplitude ratio uncertainty, with the PDF given by:

$$p(R = |r| | \mu_R, \sigma_R) = \mathcal{N}(r, \mu_R, \sigma_R) + \mathcal{N}(-r, \mu_R, \sigma_R), \tag{38}$$

$$p(R = |r| | \mu_R, \sigma_R) = \frac{2}{\sqrt{2\pi\sigma_R^2}} \left( e^{-\frac{(r-\mu_R)^2}{2\sigma_R^2}} + e^{-\frac{(-r-\mu_R)^2}{2\sigma_R^2}} \right), \tag{39}$$

defined over r≥0, and the cumulative distribution function (CDF) by $$P(R \leq |r| | \mu_R, \sigma_R) = \Phi(r, \mu_R, \sigma_R) + \Phi(-r, \mu_R, \sigma_R) - 1, \tag{40}$$

$$P(R \leq |r| | \mu_R, \sigma_R) = \frac{1}{2} \left( \text{erf}\left(\frac{r-\mu_R}{\sqrt{2}\sigma_R}\right) + \text{erf}\left(\frac{-r-\mu_R}{\sqrt{2}\sigma_R}\right) \right), \tag{41}$$

where the Gaussian PDF is given by:

$$\mathcal{N}(r, \mu_R, \sigma_R) = \frac{1}{\sqrt{2\pi\sigma_R^2}} e^{-\frac{(r-\mu_R)^2}{2\sigma_R^2}}, \tag{42}$$

$$\Phi(r, \mu_R, \sigma_R) = \frac{1}{2}\left(1 + \text{erf}\left(\frac{r-\mu_R}{\sqrt{2}\sigma_R}\right)\right). \tag{43}$$

The inversion approach uses unsigned (absolute) amplitude ratios, so the distribution reflected in R=0 must be included.

Figure 7:
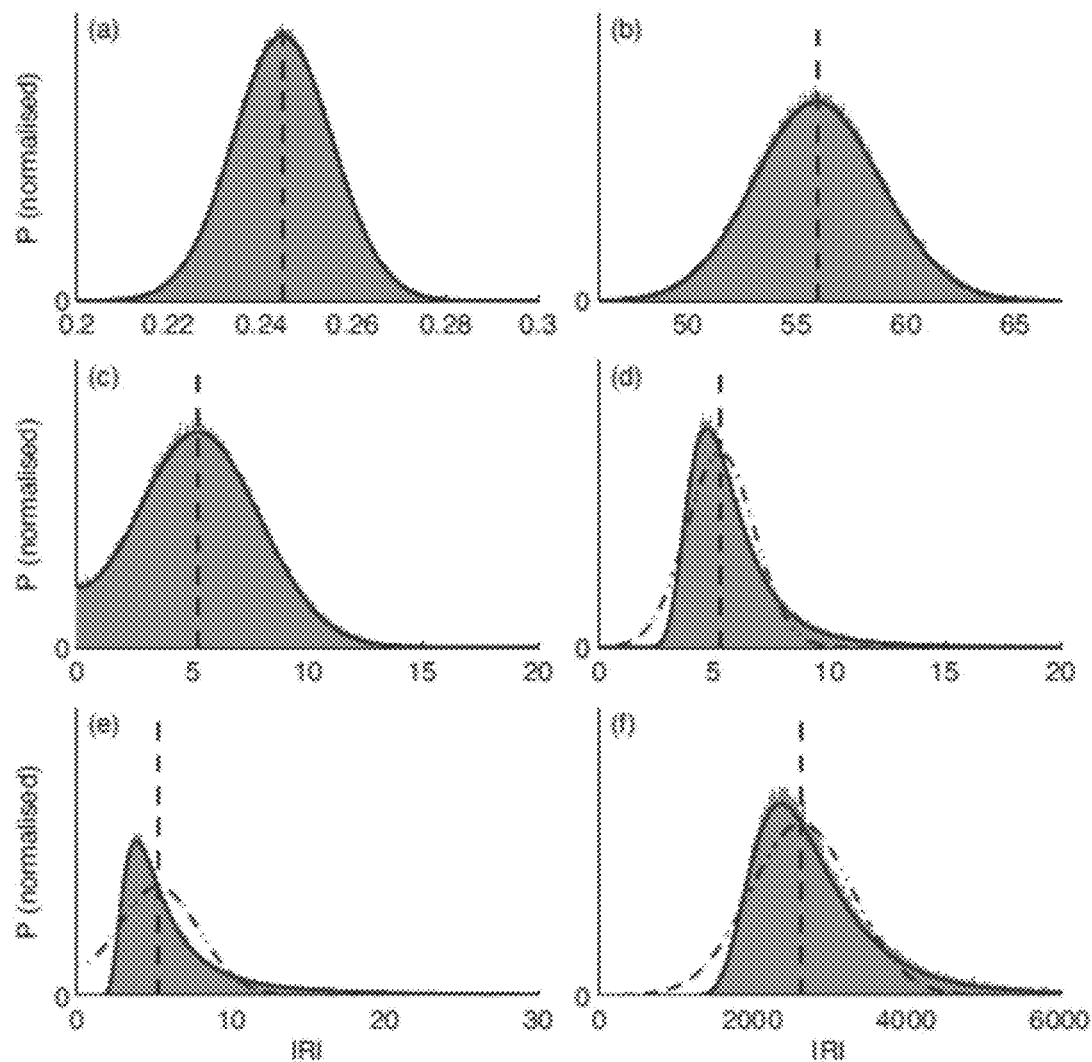
FIG. 7. Histograms of the model ratio R distributions (in grey). The dash-dot lines correspond to the Gaussian noise model (eq. 38). The solid lines correspond to the ratio distribution (eq. 53), again adding on the part corresponding to the distribution reflected in R=0 to account for the fact that the unsigned (absolute) ratio is used. The vertical dashed lines show the true value, μR, and the histograms show the actual distribution calculated from 1 000 000 samples from Gaussian distributions for $A_P$, $A_S$, and $V_P/V_S$, with $\mu_{V_P/V_S}=1.74$ and $\sigma_{V_P/V_S}=0.1$. The P and S uncertainties were varied: (a) and (b) have low P and S amplitude uncertainties (SNR>10), (c) $SNR_P=2$, $SNR_S=20$, (d) $SNR_P=15$, $SNR_S=3.8$, (e) $SNR_P=200$, $SNR_S=2$ and (f) $SNR_P=1000$, $SNR_S=4$. The vertical scales are independent between the plots as the amplitude distributions are normalized so that the area integral is 1.
Figure 8:
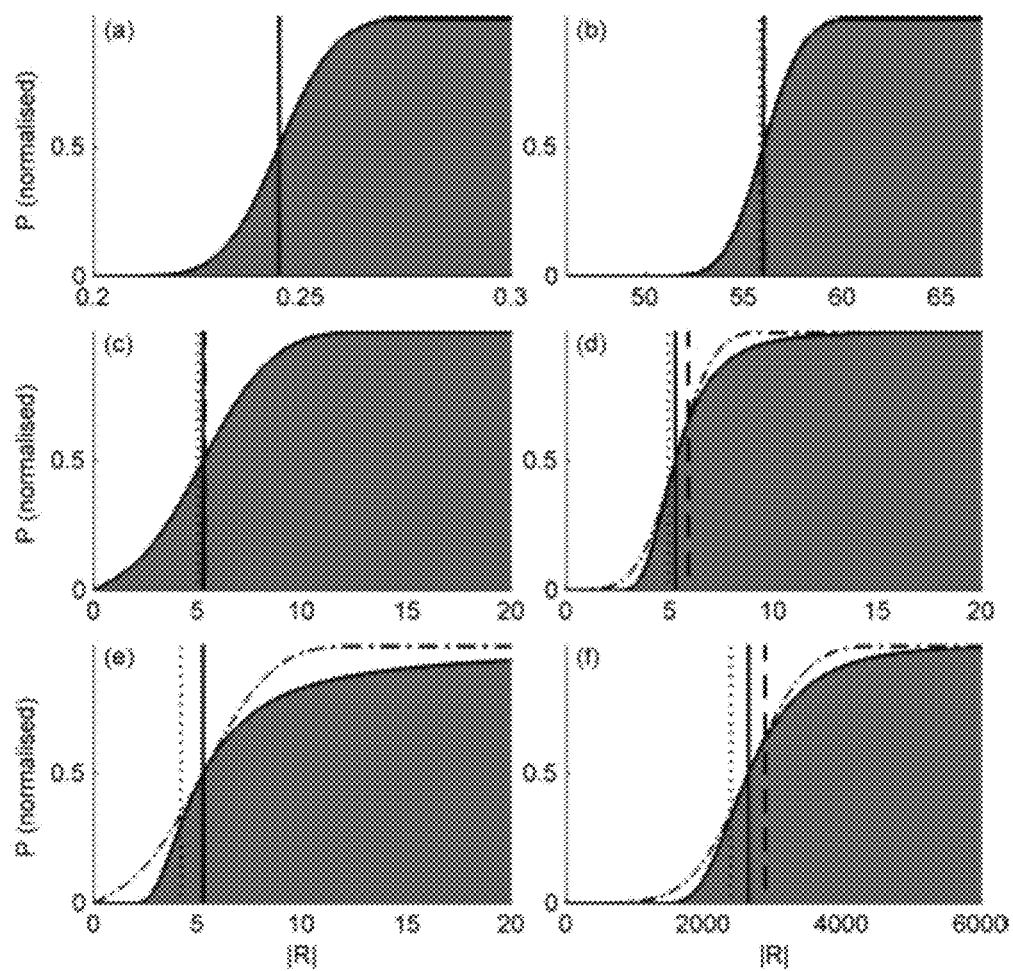
FIG. 8. Histograms of the cumulative distribution of the model ratio R (in grey). The dashed-dot lines correspond to the Gaussian noise model CDF (eq. 40). The solid lines show the ratio distribution CDF (eq. 54). The solid vertical lines correspond to $\mu_R$ and the distribution medians, the dotted vertical lines are an estimate of the distribution modes and the dashed vertical lines are the distribution means. The histograms show the actual distribution calculated from 1 000 000 samples from Gaussian distributions for $A_P$, $A_S$, and $V_P/V_S$, with $\mu_{V_P/V_S}=1.74$ and $\sigma_{V_P/V_S}=0.1$. The P and S uncertainties were varied: (a) and (b) have low P and S amplitude uncertainties (SNR>10), (c) $SNR_P=2$, $SNR_S=20$, (d) $SNR_P=15$, $SNR_S=3.8$, (e) $SNR_P=200$, $SNR_S=2$ and (f) $SNR_P=1000$, $SNR_S=4$.

FIGS. 7 and 8 show simulated distributions of the ratio given a Gaussian uncertainty in the amplitudes and the $V_P/V_S$ ratio, and it is clear that, when the denominator uncertainty is significant, the Gaussian is a poor noise model.

While the Gaussian distribution is the maximum entropy distribution given a mean and a variance, so is consistent with the uncertainty on the amplitude observations, the modelled amplitude ratio is a ratio of two normally distributed parameters. So the distribution of the ratio must be used. Assuming that a Gaussian model is sufficient for the corrected P amplitude, there are, in fact, five parameters: $\mu_P$, $\mu_{SH}$, $\sigma_P$, $\sigma_{SH}$, and $\rho$.

Fieller (1932) derived a distribution for the ratio, R=X/Y, of two normally distributed observations with means $\mu_X$ and $\mu_Y$, standard deviations $\sigma_X$ and $\sigma_Y$, and correlation $\rho$. $\rho$ is the correlation between the parameters. The PDF for R is determined from the joint density of X, Y, g(x, y) by:

$$p(R=r) = \int_{-\infty}^{\infty} |y| g(ry, y) dy. \quad (44)$$

Substituting a bivariate normal density for g(x, y) gives the ratio PDF (Hinkley 1969), $$p(R=r) = \frac{b(r)d(r)}{\sigma_X \sigma_Y a^3(r)\sqrt{2\pi}} \left[ \Phi\left(\frac{b(r)}{a(r)\sqrt{1-\rho^2}}\right) - \Phi\left(\frac{-b(r)}{a(r)\sqrt{1-\rho^2}}\right) \right] + \frac{\sqrt{1-\rho^2}}{\pi \sigma_X \sigma_Y a^2(r)} e^{\left(-\frac{r}{2(1-\rho^2)}\right)}, \quad (45)$$

where $\phi(x)$ is the Gaussian CDF (eq. 43). The coefficients in eq. (45), a(r), b(r), c and d(r) given by $$a(r) = \sqrt{\frac{r^2}{\sigma_X^2} - 2\rho \frac{r}{\sigma_X \sigma_Y} + \frac{1}{\sigma_Y^2}}, \quad (46)$$

$$b(r) = \frac{\mu_X r}{\sigma_X^2} - \rho \frac{\mu_X + \mu_Y r}{\sigma_X \sigma_Y} + \frac{\mu_Y}{\sigma_Y^2}, \quad (47)$$

$$c = \frac{\mu_X^2}{\sigma_X^2} - 2\rho \frac{\mu_X \mu_Y}{\sigma_X \sigma_Y} + \frac{\mu_Y^2}{\sigma_Y^2}, \quad (48)$$

$$d(r) = e^{\left(\frac{b^2(r) - c a^2(r)}{2(1-\rho^2) a^2(r)}\right)}. \quad (49)$$

This ratio PDF shows a much better fit to the sampled ratio distributions (FIG. 7) than the Gaussian model, and a corresponding better fit to the CDFs (FIG. 8). Unlike the Gaussian PDF, there is a dependence on the numerical values of the errors and eq. (45) is not symmetrical in the ratio and the means.

For ease of use throughout the rest of this description, the ratio PDF (eq. 45) is referred to as $\mathcal{RN}$ (r, $\mu_X$, $\mu_Y$, $\sigma_X$, $\sigma_Y$, p). The ratio distribution has a CDF given by eq. (50) (Hinkley 1969):

$$P(-\infty < R \le r) = \Phi_{R_N}(r, \mu_X, \mu_Y, \sigma_X, \sigma_Y, \rho) \quad (50)$$
$$= L\left(\frac{\mu_X - \mu_Y r}{\sigma_X \sigma_Y a(r)}, -\frac{\mu_Y}{\sigma_Y}; \frac{\sigma_Y r - \rho \sigma_X}{\sigma_X \sigma_Y a(r)}\right) + L\left(\frac{\mu_Y r - \mu_X}{\sigma_X \sigma_Y a(r)}, \frac{\mu_Y}{\sigma_Y}; \frac{\sigma_Y r - \rho \sigma_X}{\sigma_X \sigma_Y a(r)}\right),$$

where $L(u, v; \gamma)$ is the standard bivariate integral:

$$L(u, v; \gamma) = \frac{1}{2\pi\sqrt{1-\gamma^2}} \int_h^{\infty} \int_k^{\infty} e^{-\frac{x^2 - 2\gamma x y + y^2}{2(1-\gamma^2)}} dx dy, \quad (51)$$

with zero means and covariance matrix V:

$$V = \begin{pmatrix} 1 & \gamma \\ \gamma & 1 \end{pmatrix}. \quad (52)$$

To account for the fact that the amplitude ratio used is unsigned (absolute), the PDF used is given by eq. (53):

$$p(R=|r|) = \mathcal{RN}(r, \mu_X, \mu_Y, \sigma_X, \sigma_Y, p) + \mathcal{RN}(-r, \mu_X, \mu_Y, \sigma_X, \sigma_Y, p). \quad (53)$$

Therefore, the likelihood for the absolute ratio is given $$\phi \mathcal{RN}_{(|r|, \mu_X, \mu_Y, \sigma_X, \sigma_Y, p)} = \phi \mathcal{RN}_{(r, \mu_X, \mu_Y, \sigma_X, \sigma_Y, p)} + \phi \mathcal{RN}_{(-r, \mu_X, \mu_Y, \sigma_X, \sigma_Y, p)} - 1, \quad (54)$$

where $\mu_X$, $\mu_Y \ge 0$. For the amplitude ratio distribution, $\rho$ is assumed to be zero, because the observations are independent.

4.3.3 Amplitude Ratio PDF

The amplitude ratio noise model is given by the ratio PDF (eq. 53). The ratio PDF is not symmetric in the means and the ratio, but it is straightforward to show that the distribution depends only on the ratio of the means and the percentage errors, and so the uncertainties in eq. (53) ($\sigma_X$ and $\sigma_Y$) are determined from the percentage error in the measurement:

$$\sigma = A_{mes} \frac{\sigma_{mes}}{A_{model}}. \quad (55)$$

The likelihood PDF (eq. 28) can be marginalized using the uncertainty scaling (eq. 55) and the ratio noise model (eq. 53) to give:

$$p(R=|r||A_X, A_Y, \sigma_X, \sigma_Y) = \int \delta\left(r - \frac{A_X}{A_Y} - \Delta_R\right) p\left(\frac{A_X}{A_Y} + \Delta_R | A_X, A_Y, \sigma_X, \sigma_Y\right) d\Delta_R, \quad (56)$$

which can be evaluated using this property of the delta function:

$$\int_{-\infty}^{\infty} \delta(s-x) f(s) ds = f(x). \quad (57)$$

The distribution for the ratio uncertainty is then given by:

$$p\left(\frac{A_X}{A_Y} + \Delta_R | A_X, A_Y, \sigma_X, \sigma_X\right) = \mathcal{R}_N\left(\frac{A_X}{A_Y} + \Delta_R, A_X, A_Y, \sigma_X, \sigma_X, 0\right) + \mathcal{R}_N\left(-\frac{A_X}{A_Y} - \Delta_R, A_X, A_Y, \sigma_X, \sigma_X, 0\right). \quad (58)$$

Therefore, the marginalized PDF is given by:

$$p(R=|r||A_X, A_Y, \sigma_X, \sigma_X) = \mathcal{RN}(r, A_X, A_Y, \sigma_X, \sigma_X, \rho=0) + \mathcal{RN}(-r, A_X, A_Y, \sigma_X, \sigma_X, \rho=0). \quad (59)$$

4.4 Source PDF Representations

Because the normalized full moment tensor source is 5-D, it is difficult to represent the source on paper, and there are several different methods of representing the source (Hudson et al. 1989; Riedesel & Jordan 1989; Chapman & Leaney 2011; Tape & Tape 2012a). The same is true of representing the source PDF using the Hudson plot or the fundamental eigenvalue lune (Tape & Tape 2012a).

Care must be taken in interpreting the plots as well as how to plot the source PDF. Both the Hudson plot and the fundamental lune plot only show the source type, rather than any orientation information, so the PDF should first be marginalized with respect to the orientation parameters, when plotting the source PDF using these projections. The most likely source type from the marginalized PDF cannot be linked to any orientation, and it does not necessarily correspond to the maximum probability source from the full (unmarginalized) PDF.

It may be of more use to examine the silhouette of the full PDF projected onto this projection, which shows the maximum probability value from the unmarginalized PDF for each coordinate point on the plot, rather than the integral over the marginalized parameters as in the marginalized case. This silhouette plot allows deductions to be made about the maximum probability source, as well as its orientation. A similar approach can be applied to the orientation information of a source, considering either the most likely orientation marginalized over the source-type parameters, or the orientation of the most likely source.

A comparison of the silhouette and orientation marginalized Hudson projections is shown in FIG. 9. There is a difference between the marginalized and silhouette plots, with an improved constraint for the marginalized plots. However, while the most likely source type is well constrained, the source type of the most likely moment tensor is not, although in both cases, they do broadly agree.

5 Distinguishing Between Moment Tensor and Double-Couple Solutions

As mentioned above, it is often desirable to understand whether a source is a full moment tensor, or if deviations from the double-couple source are due to over-fitting of the source by the extra free parameters. There are several approaches to distinguishing between the full-moment tensor and double-couple source models, but the method described herein allows a clear understanding of the robustness of any non-double-couple component in a source.

One approach to estimating whether the result is due to over-fitting is the Bayesian Information Criterion (BIC), $\mathcal{I}^B$, introduced by Schwarz (1978):

$$\mathcal{I}^B = 2 \ln \mathcal{L}_{max} - k \ln n, \tag{60}$$

where $\mathcal{L}_{max}$ is the maximum likelihood for the model, k is the model dimension, and n is the number of data points used. This provides a method for comparing the double-couple and the full moment tensor models. The absolute values are not useful, but the difference between values for the models is used as an indicator of evidence for the model with larger BIC. In the literature, differences between 2 and 6 are regarded as evidence for the larger BIC model, between 6 to 10 are considered strong evidence, and differences bigger than 10 are considered very strong evidence (Mukherjee et al. 1998; Jeffreys 1998).

However, because the approach described herein samples the full source PDF using eqs (17) or (18), it is possible to use the Bayesian model evidence:

$$p(\text{data} \mid \text{model}) = \int_x p(\text{data} \mid x) p(x \mid \text{model}) dx. \tag{61}$$

This is a more complex approach with a more easily understood result, corresponding to the likelihood of the data given the model type. It requires good sampling of the unnormalized likelihoods to compare between the models, with the higher dimensional models being penalized by the parameter priors. The resultant number corresponds to the data likelihood given the model, with a higher likelihood corresponding to a better model.

From the likelihood (eqs 17 and 18), the Bayesian model evidence can be evaluated by summing over the probability samples:

$$p(\text{data}|\text{model}) = \sum_x p(\text{data}|x) p(x|\text{model}) \Delta x. \tag{62}$$

but care must be taken with the choice of the prior parameterization. This must correspond to the same parameterization in which the Monte Carlo samples were drawn, either directly or by correcting both the prior distribution and the $\Delta x$ values. A Monte Carlo approach can be affected by small sample sizes in the integration, which is sometimes the case when the source PDF is dominated by a few very large probability samples.

The Bayesian evidence for the full moment tensor and double-couple models can be converted into the corresponding posterior values ($p_{DC}$ and $p_{MT}$) using Bayes' theorem (eq. 4) for a suitable prior such as the uniform prior p=0.5. The posterior probabilities can be normalized together because the source is either a full moment tensor or a double-couple source. This is similar to a test of the hypothesis that an event is non-double-couple. Consequently, the approaches for determining statistical significance levels, well known in hypothesis testing can be applied, similar to Horálek et al. (2010) using the F-test. The resultant probabilities help distinguish between whether or not a source is double-couple, providing discrimination between different types of events, and, therefore between different physical processes and source interpretations (Baig & Urbancic 2010).

6 Synthetic Examples

A set of synthetic seismograms was computed from randomly generated moment tensor sources using a finite difference approach (Bernth & Chapman 2011) for a 1-D velocity model expanded into three dimensions. Random Gaussian noise was added to the traces in varying SNRs, close to a targeted ratio, although real-world events often have larger variation in SNR across a network. The synthetic examples are used to explore the dependency of the PDF solutions on different types of uncertainty, for both the fully constrained double-couple space and the full moment tensor space. The chosen prior for each case was the uniform prior, so no preferred source mechanism, or orientation was specified.

6.1 Processing and Inverting the Data

Figure 10:
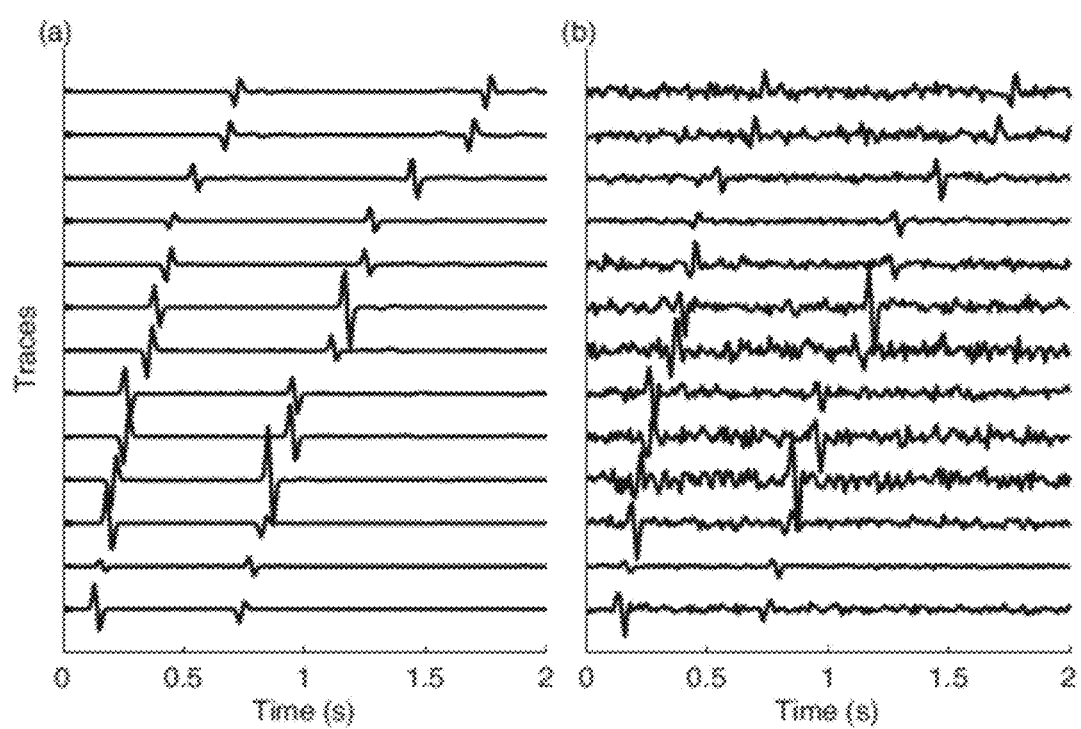
FIG. 10. Example vertical component synthetic data for a double-couple source with added Gaussian noise. (a) shows the synthetic data, and (b) the same data with the added noise with an SNR of 3. The frequency content of the signal is band-pass filtered between 1 and 40 Hz.

The synthetic data (FIG. 10) were manually picked for both P and S arrival times and P polarities, and then located using NonLinLoc (Lomax et al. 2000, 2009) and a simplified version of the known velocity model. The arrival time picks were used to automatically window and measure P-, SH- and SV-wave amplitudes. A simple Monte Carlo random search algorithm was used to produce samples of the posterior PDFs (FIGS. 11-17), calculated as in Section 34.1, in both double-couple space and the unconstrained full moment tensor space, using sample sizes in the range of 105-108 for the double-couple constrained solutions and 107-1010 for the full moment tensor solutions, running on a small computing cluster for up to an hour for the inversions with the largest sample sizes. Two sets of inversions were carried out, one using only polarity data and the second including amplitude ratios.

6.2 Network Dependency of the Solutions

The network geometry can lead to uncertainties in the source inversion, because the sampling of the focal sphere by the receivers often does not constrain the source well, leading to an increased range of possible solutions (Vavryčuk 2007; Godano et al. 2009; Kim 2011). Increasing the number of receivers does not always improve the solution, since the receivers need to improve the sampling of the focal sphere to improve the constraint. It is possible to invert for the source from a small number of waveforms, but this is not always stable and can lead to large uncertainties (Kim et al. 2000; Vavryčuk 2007).

An event generated from a double-couple source was located and inverted for different numbers of stations and geometries (FIG. 11), with no location uncertainty included (eq. 17 with no additional location samples, M=1). The results show that the range of possible solutions increases as the constraints from the station geometry decrease, either because the number of stations decreases or the distance between them increases. However, in all cases, the addition of amplitude ratios into the solutions reduces the range of possible solutions, sharpening the PDF.

The double-couple solution for the polarity-only inversion is well constrained, with orientation similar to the source and little variation in the range of solutions. But as the number of stations decreases, the range of non-zero solutions increases, with deviation from the source. The full moment tensor solutions show a wider range of solutions as the number of receivers decreases, along with some deviation of the PDF from the double-couple point.

Including amplitude ratios reduces the dependence of the solutions on the network distribution. The double-couple solutions are well constrained, with orientations similar to the source, and there is little variation in the range of solutions, even as the number of stations reduces. In both cases, the station geometry is more important than the number of stations, as a low station coverage case may still provide well-constrained solutions if there are sufficient constraining station positions (cf. Panza & Sarao 2000; Šilený et al. 1996). For full moment tensor solutions, the nodal regions of the radiation pattern are not necessarily planar, unlike the double-couple solution and, therefore, more stations are required to constrain the solution.

Figure 11:
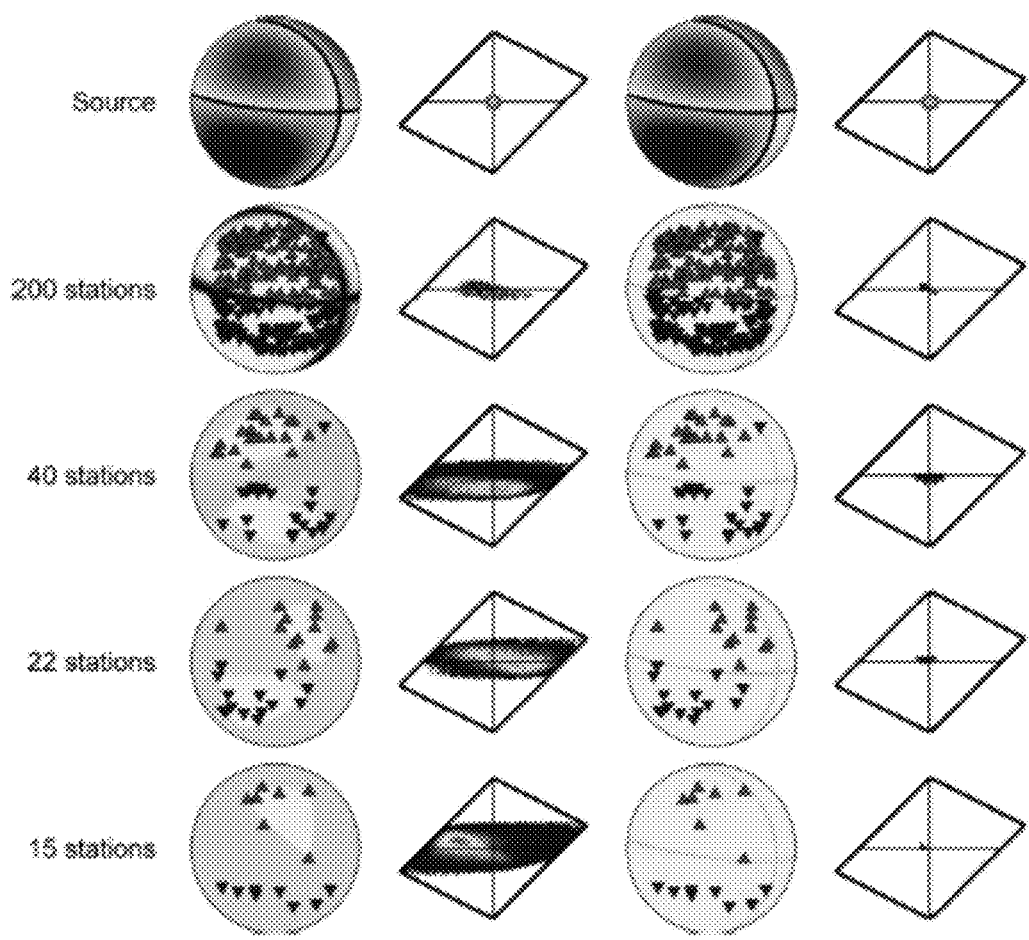
FIG. 11. Lower hemisphere equal area projections and Hudson plots of the source PDF for a synthetic double-couple source with a range of station numbers and geometries. The first and third columns show the source PDF for the solution constrained to be double-couple only. The second and fourth columns show the source PDF for the full moment tensor solution. The first two columns show the solutions for inversions using only polarity data, and the second two columns show the solutions using polarity and amplitude ratio data. Manually picked station first motions are given by upward red or downward blue triangles. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence are, from top to bottom, 0.97, 0.40, 0.77 and 0.63, for polarity only inversions and 0 for the inversions including amplitude ratios, except for the 15 receiver examples which has $p_{DC}=1$.

All of the solutions in FIG. 11 using polarities and amplitude ratios had high values for the posterior model probabilities (Section 5) for the full moment tensor model, despite the solutions visually resembling double-couple solutions. The PDFs are dominated by a few high-probability samples in the full moment tensor case, which can lead to uncertainties in the Monte Carlo integration approach used to calculate the Bayesian evidence, as discussed in Section 5. The very large likelihoods associated with these samples may be due to mischaracterization of the amplitude ratios and associated uncertainties as shown in Section 4.3.1. The posterior model probabilities for the inversions using only polarities are significant for the double-couple source model, suggesting that it is the more likely source model.

The results shown here are consistent with those of (Vavryčuk 2007; Godano et al. 2009; Kim 2011) showing that the position of the receivers is important for constraint of the source PDF, not just the number of receivers.

6.3 Noise Dependency of the Solutions

Figure 12:
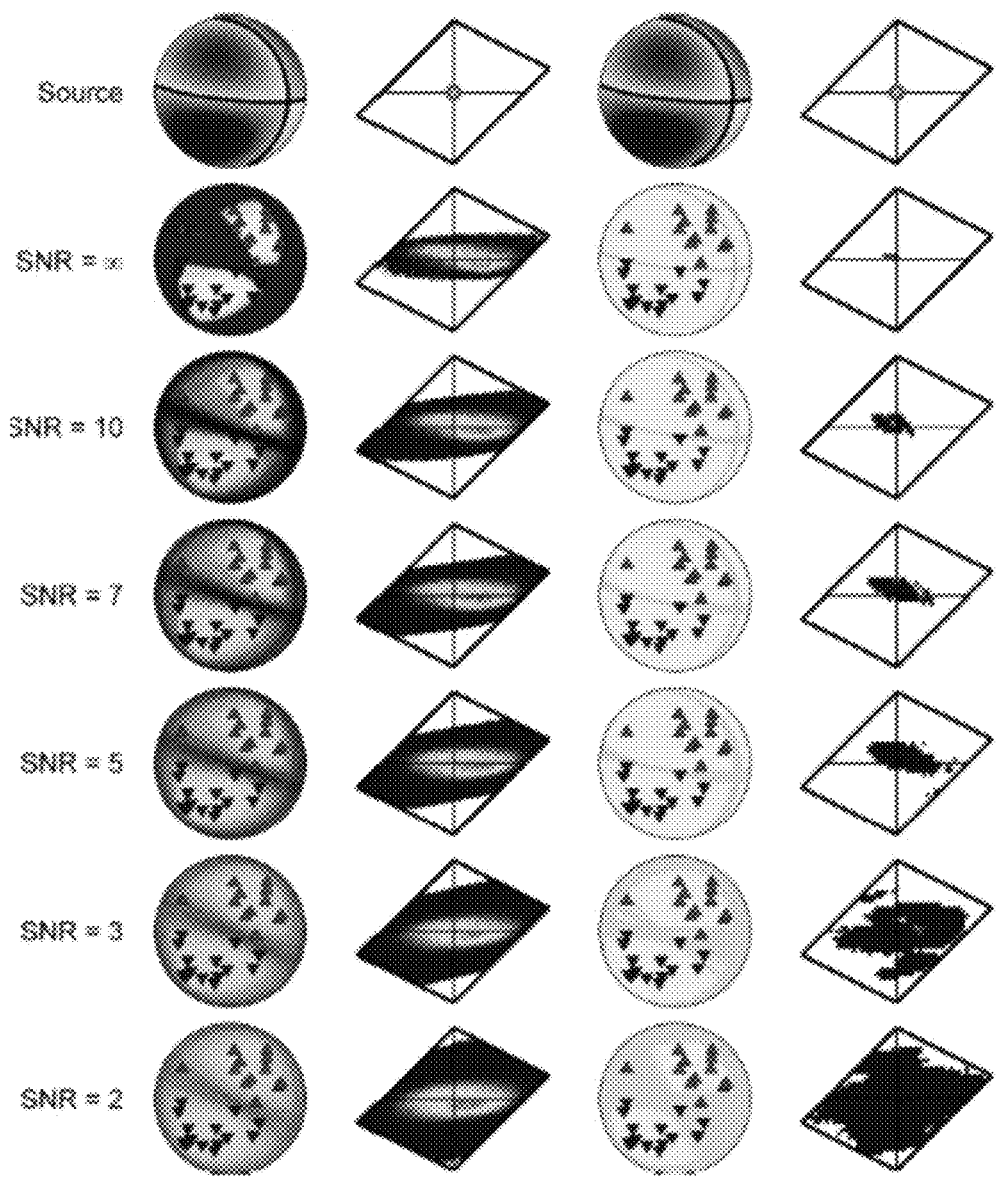
FIG. 12. Lower hemisphere equal area projections and Hudson plots of the source PDF for a synthetic double-couple source for a range of data uncertainties, corresponding to SNR=∞, SNR=10, SNR=7, SNR=5, SNR=3 and SNR=2. The first and third columns show the source PDF for the solution constrained to be double-couple only. The second and fourth columns show the source PDF for the full moment tensor solution. The first two columns show the solutions for inversions using only polarity data, and the second two columns show the solutions using polarity and amplitude ratio data. Manually picked station first motions are given by upward red or downward blue triangles. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence are, from top to bottom, 0.77, 0.78, 0.80, 0.84, 0.91 and 0.94, for the polarity only inversion, and 1.0, 0.01, 0, 0, 0.02 and 0.01, for the polarity and amplitude ratio inversions.

The effects of noise on the inversion are difficult to test, because noise has a large effect on the different steps leading up to the source inversion. FIG. 12 shows the solutions from inverting the synthetic event with 22 stations for varying levels of uncertainty in the data, corresponding to the likelihood in eq. (17) with no additional location samples (M=1). The noise was not applied to the full workflow (arrival picking and location) but only to the polarity and amplitude ratio data used in the source inversion.

As the SNR decreases, the source solutions increase in range, showing some rotation away from the true source, and the full moment tensor PDF deviates from the double-couple point. The solutions using amplitude ratios show more uncertainty and skew as the SNR decreases. This is consistent with the results shown in Section 4.3.1, where the noise introduced a systematic deviation into the amplitude measurements, which may lead to the deviation of the full moment tensor solution from the true source. Alternatively, the polarity-only inversions show a wider range of possible solutions, with decreasing maximum probability. However, the orientation remains similar for the double-couple case, and the full moment tensor solutions show a wider range of possible solutions.

The Bayesian evidence for the solutions varied, with very low double-couple posteriors for the polarity and amplitude ratio examples with SNR≤10, with posterior values $p_{DC} \leq 0.02$, despite the solutions appearing to be good double-couple solutions from a visual inspection. Similarly to the solutions in FIG. 11, these full moment tensor solutions are dominated by a few high-probability samples, which can lead to uncertainties in the Monte Carlo integration approach used to calculate the Bayesian evidence. However, the polarity-only cases have much more significant Bayesian evidence values, with the lowest value $p_{DC}=0.77$ for the SNR=∞ case, and the values increasing with increasing noise level.

The noise has a larger overall effect on the workflow than that explored above, as it also affects the ability to make the arrival pick and to determine the location precisely. To investigate this, the synthetic event was manually reprocessed at different noise levels, and then inverted for the source using the likelihood in eq. (17) with no additional location samples (M=1). The noise levels were not uniform across each waveform, but the noise was added so that the average SNR was consistent with the desired SNR values. Adding noise reduces the number of confident picks, increasing the range of possible solutions, partially due to the network distribution (Section 6.2).

Figure 13:
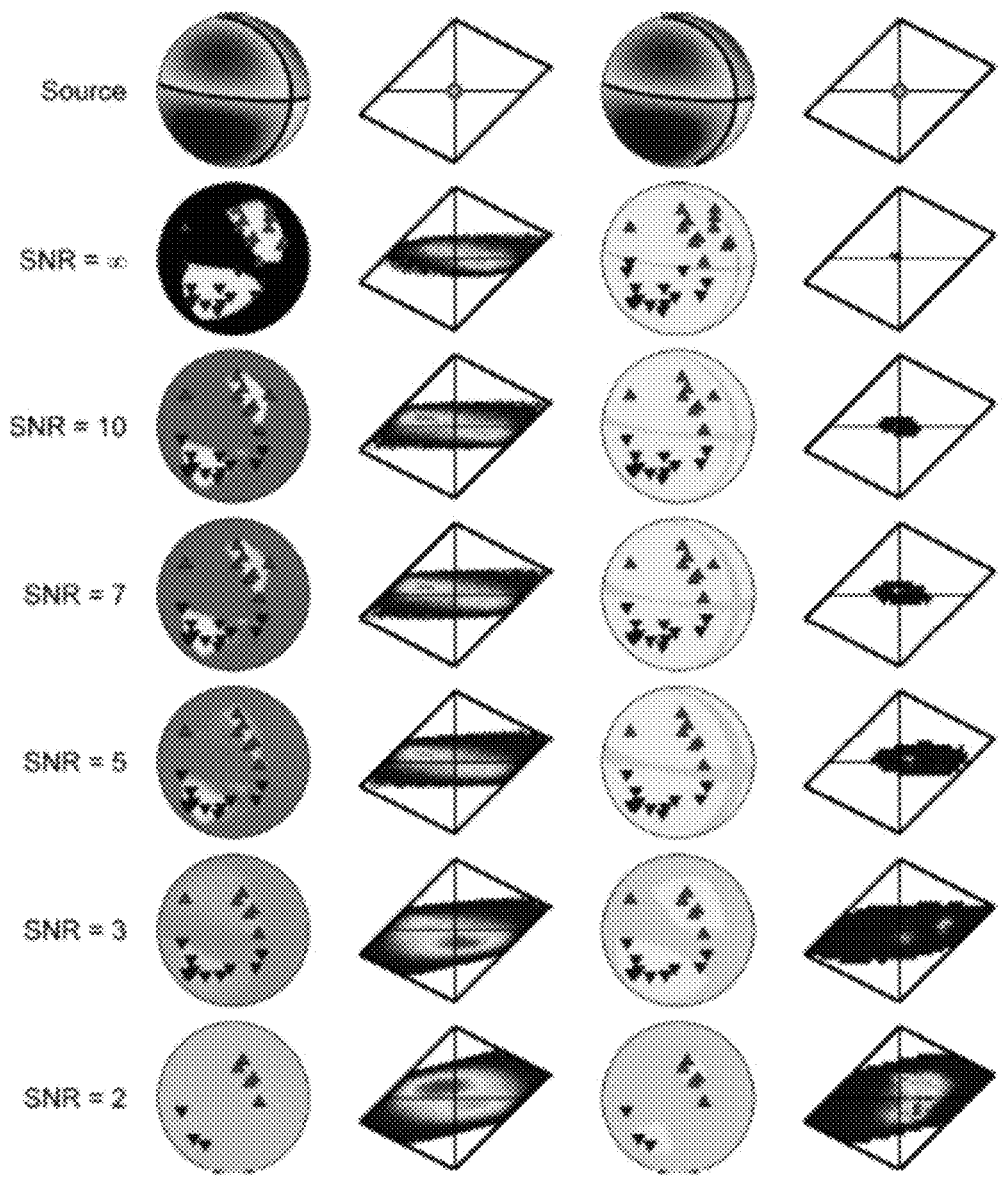
FIG. 13. Lower hemisphere equal area projections and Hudson plots of the source PDF for a synthetic double-couple source with a range of noise levels, SNR=∞, SNR=10, SNR=7, SNR=5, SNR=3 and SNR=2. The first and third columns show the source PDF for the solution constrained to be double-couple only. The second and fourth columns show the source PDF for the full moment tensor solution. The first two columns show the solutions for inversions using only polarity data, and the second two columns show the solutions using polarity and amplitude ratio data. Manually picked station first motions are given by upward red or downward blue triangles. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence are, from top to bottom, 0.77, 0.71, 0.71, 0.77, 0.64 and 0.62, for the polarity only inversion, and 0, 0.99, 0.70, 0.84, 0.82 and 0.58, for the polarity and amplitude ratio inversions.
Figure 14:
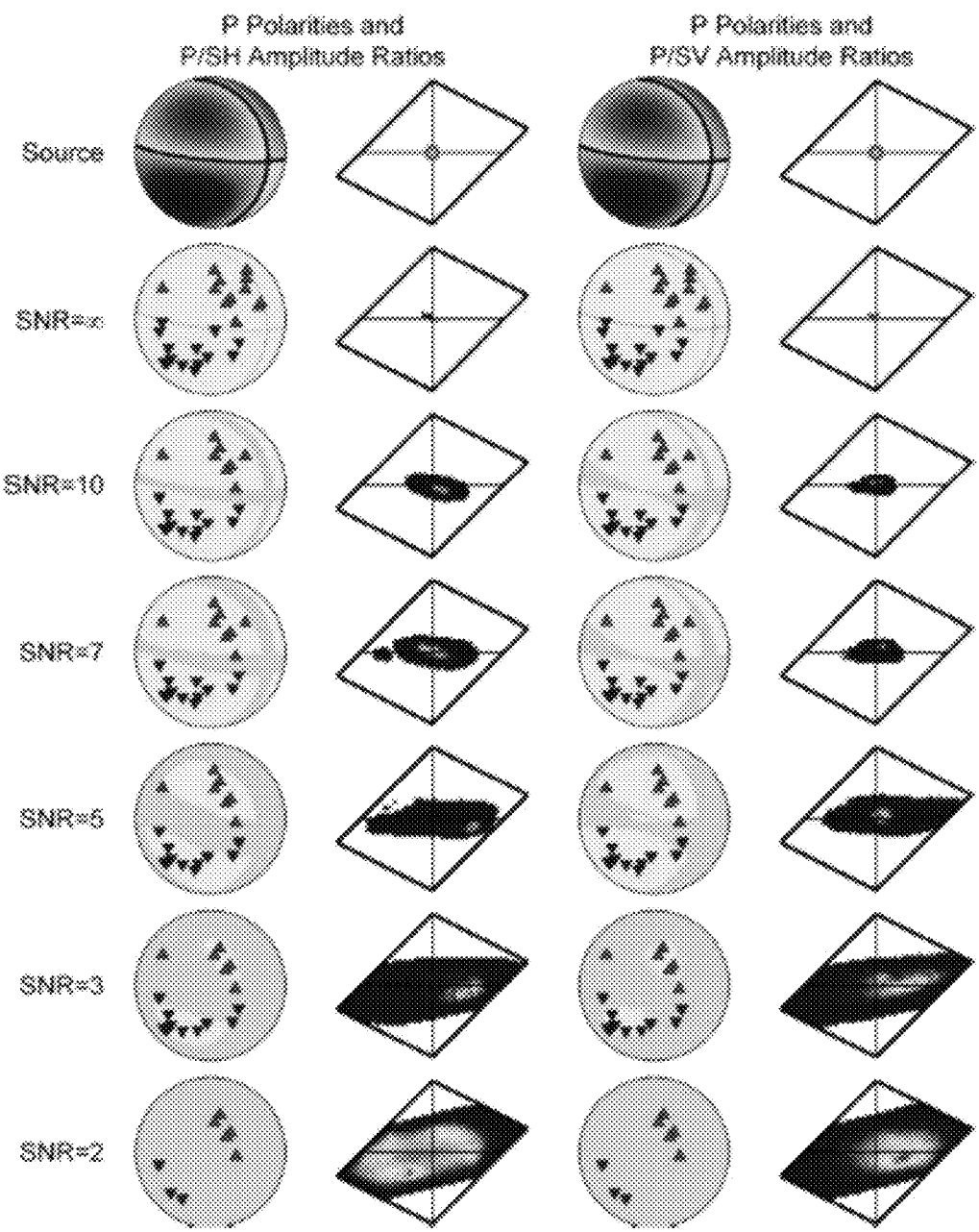
FIG. 14. Lower hemisphere equal area projections and Hudson plots of the source PDF for a synthetic double-couple source using P polarity and either P/SH- or P/SV-amplitude ratios. The first and third columns show the source PDF for the solution constrained to be double-couple only. The second and fourth columns show the source PDF for the full moment tensor solution. Manually picked station first motions are given by red (up) or blue (down) points, with darker points corresponding to more likely locations. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9.
Figure 15:
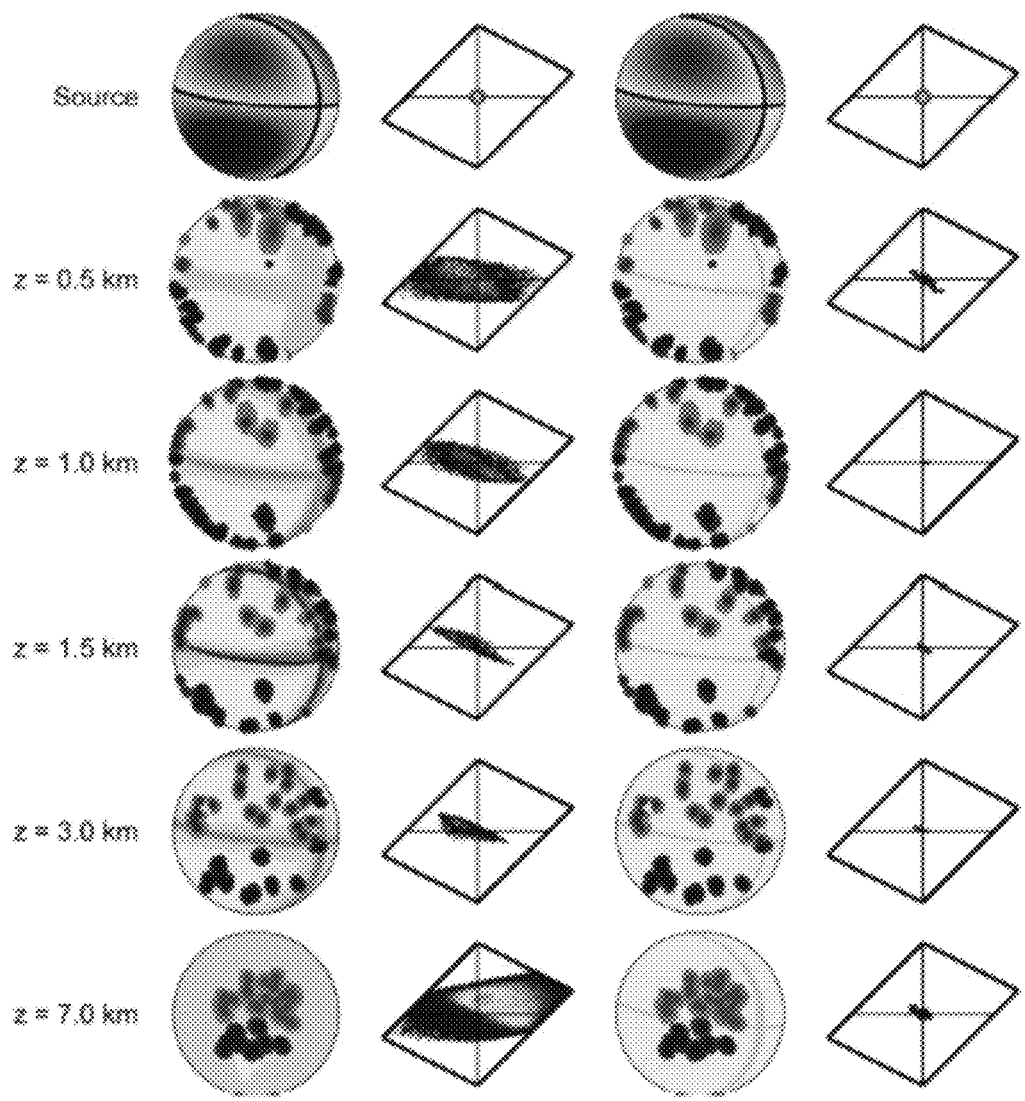
FIG. 15. Lower hemisphere equal area projections and Hudson plots of the source PDF, marginalized over the location uncertainty, for a synthetic double-couple source at a range of source depths in the centre of an array, z=0.5 km, z=1 km, z=1.5 km, z=3 km and z=7 km. The first and third columns show the scatter of station ray positions on the focal sphere for the NonLinLoc location PDF and the source PDF for the solution constrained to be double-couple only. The second and fourth columns show the source PDF for the full moment tensor solution. The first two columns show the solutions for inversions using only polarity data, and the second two columns show the solutions using polarity and amplitude ratio data. Manually picked station first motions are given by red (lighter) or blue (darker) points, with darker points corresponding to more likely locations. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double couple source model determined from the Bayesian evidence are, from top to bottom, 0.80, 0.91, 0.74, 0.95 and 0.38, for the polarity only inversion, and 0.99, 0, 1, 1 and 1, for the polarity and amplitude ratio inversions.

As with the solution with only increased uncertainty in the inversion data (FIG. 12), the maximum probability of the full moment tensor solutions deviates from the double-couple source as the SNR decreases (FIG. 13). The lowest SNR case shows very poor constraint of the double-couple solutions with a much larger range than observed in FIG. 12. This uncertainty is much more pronounced because of the reduced number of stations. The double-couple solutions are consistent with the source, and those of FIG. 12 for the polarity-only inversion. However, there is a much wider range of possible solutions in both the double-couple and the full moment tensor solutions for the results using both polarities and amplitude ratios, as well as large deviations from the true source values. This is probably due to the increased difficulty of measuring the amplitudes as the noise level increases and the deviation of the measurement as the noise level increases, as described in Section 4.3.1.

The distribution from the full moment tensor inversion shows that adding noise increases the range of possible non-double-couple solutions, as well as moving the maximum probability full moment tensor source away from the double-couple point. This may be a possible explanation for some reported non-double-couple type sources. The effect of the noise on the solutions using amplitude ratios is much stronger than that of the station distribution, although increasing the noise level does change the station distribution as well because some arrivals cannot be seen above the background noise, leading to an often strong effect on polarity-only inversions. Consequently, at higher noise levels, the network distribution has an even greater effect, leading to more deviation from the true source as the number of stations is reduced.

A few examples show multi-modal PDFs in the full moment tensor case, especially when including amplitude ratios. Although it can be expected that the source PDF does not have to be mono-modal, some of the multi-modality may arise from the amplitude ratio distributions, shown in FIG. 14, which demonstrates that the solutions using different amplitude ratios can often be inconsistent. So care must be taken when including them in any inversion, especially at higher noise levels.

The posterior model probabilities (Section 6) for these solutions are more consistent with the expected values. Although, again, the SNR=∞ case using both polarity and amplitude-ratio observations has a very low likelihood for the double-couple model, the PDF is dominated by a few very high probability samples, which can lead to uncertainties in the Monte Carlo integration approach used to calculate the Bayesian evidence. However, the remaining solutions have values more consistent with a visual interpretation of the source PDFs, and all suggest that the double-couple model cannot be discarded.

6.4 Location Dependency of the Solutions

To investigate the location dependency of the recovered source PDF (using eq. 17), the synthetic source from Section 6.2 was used to generate synthetic seismograms for different source depths. These synthetics were then inverted for a randomly generated network geometry of 39 stations at an SNR of 20, while including the location uncertainty as described in Section 4.1. The effect of this uncertainty on the station angles can be seen in FIG. 15. In this case, the location is well constrained for all the possible solutions and there is not much uncertainty in the source-receiver ray take-off angles and azimuths. However, were the noise level to increase, this uncertainty would also increase.

The double-couple constrained solutions mainly show a small range of possible orientations, although there is also an effect on the network distribution, with the ray paths moving from being equatorial on the focal sphere for shallow depths to more vertical paths as the depth increases. This leads to additional uncertainties arising from clustering of stations on the focal sphere in the 7.0 km depth example, especially for the polarity-only inversion, which is very poorly constrained. The full moment tensor solutions show a similar small range of solutions, and most are close to double-couple. The sources at 0.5 and 7.0 km depths have the largest range of solutions, linked to the specific network geometries. As in previous cases, including amplitude ratios in the inversion greatly improves the source constraint.

The posterior model probabilities are all consistent with the double-couple source, apart from the solution using both polarities and amplitude ratios at 1.0 km depth: This again is not well constrained due to the domination of the full moment tensor PDF by a few very-high-probability samples.

Figure 16:
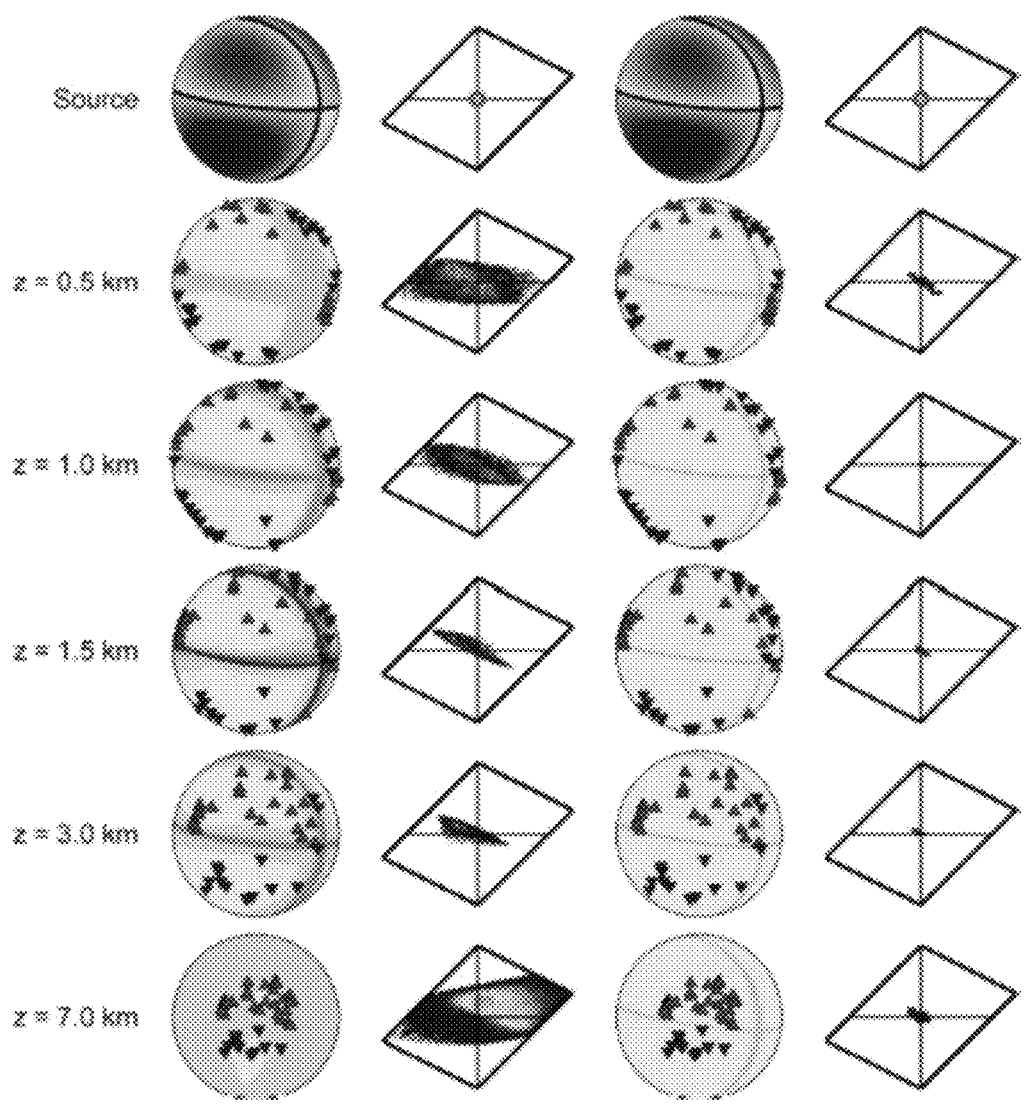
FIG. 16. Lower hemisphere equal area projections and Hudson plots of the source PDF, without location uncertainty, for a synthetic double-couple source at a range of source depths in the centre of an array, z=0.5 km, z=1 km, z=1.5 km, z=3 km and z=7 km. The first and third columns show the source PDF for the solution constrained to be double-couple only. The second and fourth columns show the source PDF for the full moment tensor solution. The first two columns show the solutions for inversions using only polarity data, and the second two columns show the solutions using polarity and amplitude ratio data. Manually picked station first motions are given by red (up) or blue (down) markers. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence are, from top to bottom, 0.80, 0.89, 0.63, 0.95 and 0.38, for the polarity only inversion, and 0.99, 0, 1, 1 and 1, for the polarity and amplitude ratio inversions.
Figure 17:
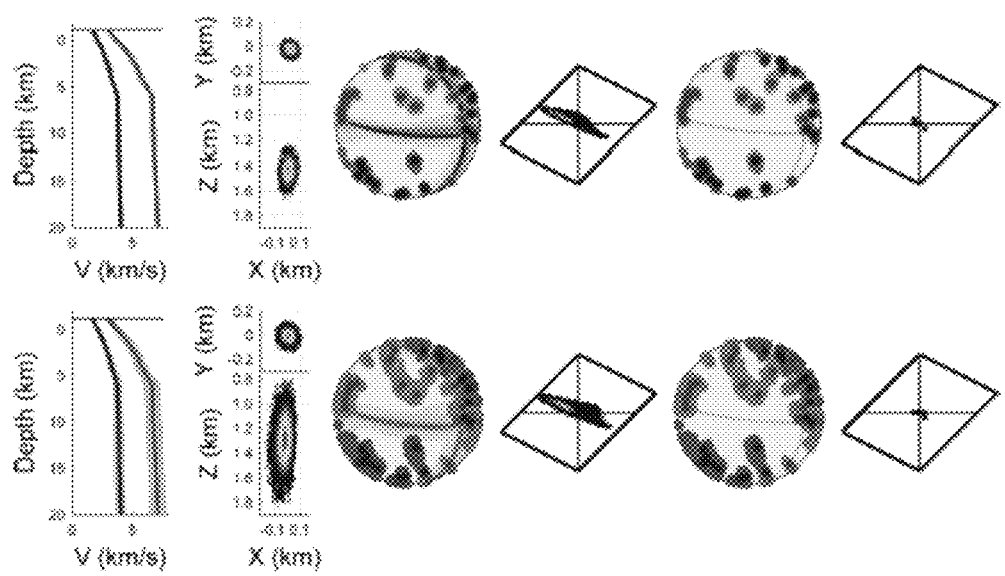
FIG. 17. Lower hemisphere equal area projections and Hudson plots of a synthetic double-couple source at a depth of 1.5 km located using two sets of velocity models perturbed from the true model. The first column shows the range of velocity models, with a 3 percent perturbation for the top row and a 10 percent perturbation for the bottom row. The second column shows the location distribution (blue indicates low probability and red high probability) for the NonLinLoc location PDF, in an XY plan view and XZ depth section. The third and fifth columns show the scatter of station ray positions on the focal sphere for the NonLinLoc location PDF and the source PDF for the solution constrained to be double-couple only. The fourth and sixth columns show the source PDF for the full moment tensor solution. The first two columns of source PDFs show the solutions for inversions using only polarity data, and the second two show the solutions using polarity and amplitude ratio data. Manually picked station first motions are given by red (lighter) or blue (darker) points, with darker points corresponding to more likely locations. For the focal sphere plots, possible fault planes are given by dark lines. The most likely fault planes are given by the darkest lines. For the Hudson plots, high probability is red and low probability is in blue. The positions of the different source types on the Hudson plot are shown in FIG. 9. The posterior model probabilities for the double-couple source model determined from the Bayesian evidence are, for the 0.86 for the 3 percent perturbation and 0.76 for the 10 percent perturbation, for the polarity only inversion, and 1.0 for both perturbations for the polarity and amplitude ratio inversions.

It is clear that the location uncertainty for well-constrained events with low noise has a small effect, although, as the noise level increases, so will the location uncertainty and its effects, as can be seen in the examples shown in Section 7. FIG. 16 shows that there is little difference between the solutions using location uncertainty and just using the maximum likelihood location, and there is only a slight change to the posterior model probabilities. However, if the location is not well-constrained, the resultant effect on the source PDF can be much larger.

The results shown here are consistent with studies of the effects of location uncertainty on source inversion, especially for full-waveform based inversions, such as Duputel et al. (2012a) and Šilený (2009), who show that in some cases, location uncertainty can cause large variations in the solution.

6.5 Velocity Model Dependency of the Solutions

The synthetic event from Section 6.4 at a source depth of 1.5 km was inverted for a range of velocity models, randomly perturbed from the true model (FIG. 17) at two perturbation levels, while including the location uncertainty using eq. (18). This location uncertainty was then sampled to create a location distribution for the range of velocity models for each perturbation level. Variation in the model leads to increased uncertainty in the source-receiver ray path angles (FIG. 17), especially for the larger velocity model perturbation, in contrast to the example in FIG. 15. This increased uncertainty causes a slightly increased range of possible orientations for the double-couple constrained solution, although the maximum probability solution is still close to the true source. The full moment tensor solution shows a small increase in the range of possible source types compared to just the location uncertainty, although there is little effect due to the low noise level. As a consequence, velocity model uncertainty does affect both the resultant location, and the source PDF, although if the location remains well constrained, the effects are less than those of the network distribution and background noise.

The posterior model probability for the double-couple source model using only polarity data is 0.86 and 0.76 for the 3 percent and 10 percent perturbations, respectively. Including amplitude ratios leads to $p_{DC}=1$ in both cases.

For these examples, a simple 1-D velocity model was used, and it was assumed to be consistent for all stations. It is possible using eq. (18) to allow the velocity models to vary independently for each station and to combine these, although this would increase the number of location samples required in the inversion. Extending the velocity model uncertainties to full 3-D heterogeneous models may make the required number of models impossibly large to include using this Monte Carlo approach.

Velocity model uncertainties have been shown in the literature to lead to non-double-couple components (Šilený 2004; Šilený & Milev 2006; Vavryčuk 2007; Šilený 2009), so including the velocity model uncertainty can be important when trying to estimate the source type. If the model is well-constrained, the uncertainty on the source PDF is minimal. Topography, site effects and near surface structure can have additional effects on both the source inversion (Šilený et al. 2001), as well as the location of the event (Bean et al. 2008; O'Brien et al. 2011).

7 Krafla Events

The inversion approach was used on four local seismic earthquakes from the Krafla geothermal region of Iceland. These events were at shallow depths ranging from 0.9 to 1.6 km and were part of a larger group detected on a temporary network between 2009 and 2010 (FIG. 18). The inversion was carried out using both the constrained double-couple and unconstrained full moment tensor source models, using P polarities only as both the P/SH and P/SV amplitude ratios were difficult to measure, with very large uncertainties. The location uncertainties from NonLinLoc were included in the inversion (eq. 17).

FIG. 19 shows both the range of double-couple solutions and the unconstrained full moment tensor inversions for these events. The double-couple results for the events B-D have large probability ranges and, even though the full moment tensor solutions do not peak at the double-couple point, they still have a significant value there. These solutions resemble those for the noise uncertainty (FIG. 13), especially the u and v distributions.

Event A is clearly non-double-couple and, although it is possible to fit some double-couple solutions to this source, these have very low probabilities, with very significant misfit from the observed data. The full moment tensor solutions show a small sharp peak near the closing tensile crack point (see FIG. 9a), with a large region of very-low-probability solutions reaching the double-couple point. The full moment tensor source PDF for event A is clearly different from the other three solutions, which are described well by a double-couple source type, when the effects shown in FIG. 13 are considered.

Events C and D appear to have a bimodality in the full moment tensor solutions, but this is partly due to the conversion of the moment tensor into the Hudson u and v coordinates (Tape & Tape 2012b).

The posterior model probabilities for the double-couple source model are consistent with this interpretation with a very low value (0.002) for Event A and values bigger than 0.7 for the others (Table 3). We therefore conclude that Event A is a non-double-couple closing crack source, but Events B-D can be described best by a double-couple failure.

TABLE 3

Posterior model probabilities and Bayesian information criterion values, $\mathcal{I}^B$, (Section 5), for the Krafla events shown in FIG. 19.

| Event | $p_{DC}$ | $\mathcal{I}_{DC}^B - \mathcal{I}_{MT}^B$ |
|---|---|---|
| A | 0.002 | −4.3 |
| B | 0.84 | 4.1 |
| C | 0.81 | 4.9 |
| D | 0.73 | 4.1 |

Table 3 also shows the evaluation of the BIC values (eq. 60) for the double-couple model, which suggest that there is strong evidence for the double-couple model for events B-D and very strong evidence for a non-double-couple model for event A. However, the values of the BIC, and the associated differences are not as informative as the posterior values from the Bayesian evidence, which provide more of a quantitative estimate of the support for the different model types.

8 Summary and Discussion

A method for source inversion based on a Bayesian approach is presented. This approach includes the uncertainties in the inversion in a rigorous framework, allowing for expansion of data types used, along with improved uncertainty determination. The method also allows the inclusion of location and model uncertainties. However, because the effects of these uncertainties on the station propagation coefficients are not independent, methods of generating the appropriate PDFs such as that proposed in Section 3 are explored. The use of prior distributions in the inversion can be extended to determine whether any apparent non-double-couple component is introduced as an artefact due to data uncertainty and the larger number of free parameters available for fitting compared to the double-couple solution.

When tested on synthetic events with a known source, the results are consistent and provide a useful approximation of the source PDF, with the estimate including the effects of the known uncertainties. The inversions of the synthetic events agree closely with the source mechanisms, with greater uncertainty arising as the noise level is increased and the number of stations reduced. Neither the velocity nor location uncertainty preclude the recovery of the source mechanism, although increasing the noise level is likely to increase the effects of these uncertainties.

Full-moment tensor inversion of the synthetic events showed deviations in the PDF maxima from the true double-couple source, which is a possible explanation for deviatoric non-double-couple source observations. Including amplitude ratios improves the constraint of the source PDF, but the systematic deviation of the amplitude measurements due to noise can lead to deviations in the resultant PDF from the true value, so care must be taken when including them in an inversion. Furthermore the low SNR (high noise) cases of FIG. 13 show that source PDFs can be multimodal, and so maximum probability approaches are unlikely to produce a good description of such a solution. Real-world amplitude ratio measurements can have additional complications such as site and near-surface effects, S-wave splitting and anisotropy and non-Gaussian noise, which can make inclusion of the amplitude ratios difficult.

The inversions of four events from the Krafla region of Iceland have double-couple solutions for Events B-D and a non-double-couple solution for Event A, supported by the posterior model probabilities from the Bayesian evidence. These values agree with the corresponding BIC values, although the posterior probabilities provide a better qualitative estimate of the support for the different model types. Both the posterior model probabilities and the BIC values support a double-couple source model for Events B-D despite the full moment tensor PDF having a strong peak away from the double-couple point, suggesting that these are good estimators of the model type. The posterior model probabilities for the double-couple model have the lowest value for Event B, which is consistent with visual interpretation of the observed source PDFs, unlike the values for the BIC, which has a smaller value for Events B and D. The non-double-couple Event A has a very sharp peak in the closing tensile crack source region, with a very low probability of fitting a double-couple solution.

The solutions generated using this approach suggest that a source inversion should examine the full source PDF, which allows a clear interpretation of the possible source types, and accounts for uncertainties as well as any multimodality. All the explored uncertainty types affect the source PDF, although the dominant effect is the noise. The noise also affects the other types of uncertainties, amplifying the effects.

The posterior model probabilities provide a useful quantitative estimate of whether the source is non-double-couple, although they can be very uncertain if the source PDF is dominated by a few very-high-probability samples. This is probably due to uncertainties from the small sample size in the Monte Carlo integration approach used to calculate the Bayesian evidence. However, for more realistic PDFs with larger uncertainties, the values correspond well to a visual interpretation of the source PDF, suggesting that it is a good approach for distinguishing between double-couple and non-double-couple sources.

9 General Remarks

The above description provides preferred exemplary embodiment(s) only, and is not intended to limit the scope, applicability or configuration of the invention. Rather, the above description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the above description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the above disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

REFERENCES

Aki, K. & Richards P. G., 2002. *Quantitative Seismology*, 2nd edn, University Science Books.

Baig, A. & Urbancic, T. I., 2010. Microseismic moment tensors: A path to understanding frac growth, *Leading Edge*, 29(3), 320-324.

Bayes T. & Price, R., 1763. An essay towards solving a problem in the doctrine of chances. By the late Rev. Mr. Bayes, F. R. S. communicated by Mr. Price, in a letter to John Canton A. M. F. R. S., *Phil. Trans. R. Soc.*, 53, 370-418.

Bean, C. J., Lokmer, I. & O'Brien, G. S., 2008. Influence of near-surface volcanic structure on long-period seismic signals and on moment tensor inversions: Simulated examples from Mount Etna, *J. geophys. Res.*, 113 (B08308), doi: 10.1029/2007jb005468.

Bernth, H. & Chapman, C., 2011. A comparison of the dispersion relations for anisotropic elastodynamic finite-difference grids, *Geophysics*, 76(3), WA43-WA50.

Brillinger, D. R., Udias, A. & Bolt, B. A., 1980. A probability model for regional focal mechanism solutions. *Bull. seism. Soc. Am.*, 70(1), 149-170.

Chapman, C. H., 2004. *Fundamentals of Seismic Wave Propagation*, Cambridge Univ. Press.

Chapman, C. H. & Leaney, W. S., 2011. A new moment-tensor decomposition for seismic events in anisotropic media, *Geophys. J. Int.*, 188(1), 343-370.

Cover, T. M. & Thomas, J. A., 2005. *Elements of Information Theory*, 2nd edn, Wiley.

Dahm, T., 1996. Relative moment tensor inversion based on ray theory: theory and synthetic tests, *Geophys. J. Int.*, 124(1), 245-257.

Delouis, B., Giardini, D., Lundgren, P. & Salichon, J., 2002. Joint inversion of In SAR, GPS, teleseismic, and strong-motion data for the spatial and temporal distribution of earthquake slip: application to the 1999 Izmit mainshock, *Bull. seism. Soc. Am.,* 92(1), 278-299.

Duputel, Z., Rivera, L., Fukahata, Y. & Kanamori, H., 2012a. Uncertainty estimations for seismic source inversions, *Geophys. J. Int.,* 190(2), 1243-1256.

Duputel, Z., Rivera, L., Kanamori, H. & Hayes, G., 2012b. W phase source inversion for moderate to large earthquakes (1990-2010), *Geophys. J. Int.,* 189(2), 1125-1147.

Dziewonski, A. M., Chou, T. A. & Woodhouse, J. H., 1981. Determination of earthquake source parameters from waveform data for studies of global and regional seismicity, *J. geophys. Res.,* 86(B4), 2825-2852.

Einarsson, P. & Saemundsson, K., 1987. Earthquake epicenters 1982-1985 and volcanic systems in Iceland, in *Í hlutarins edli, Festscript for Th. Sigurgeirsson,* ed. Sigfússon, T. I., Menningarsjodur.

Ekström, G., Nettles, M. & Dziewonski, A. M., 2012. The global CMT project 2004-2010: Centroid-moment tensors for 13,017 earthquakes, *Phys. Earth planet. Inter.,* 204-201, 1-9.

Fieller, E. C., 1932. The distribution of the index in a normal bivariate population, *Biometrika,* 24(3-4) 428-440.

Ford, S. R., Dreger, D. S. & Walter, W. R., 2008. Identifying isotropic events using a regional moment tensor inversion, in *Proceedings of the 30th Monitoring Research Review: Ground-Based Nuclear Explosion Monitoring Technologies,* 2008 September 23-25, Portsmouth, Va., sponsored by the National Nuclear Security Administration (NNSA) and the Air Force Research Laboratory (AFRL).

Foulger, G. R., Julian, B. R., Hill, D. P., Pitt, A. M., Malin, P. E. & Shalev, E., 2004. Non-double-couple microearthquakes at Long Valley caldera, California, provide evidence for hydraulic fracturing, *J. Volcanol. Geotherm. Res.,* 132(1), 45-71.

Godano, M., Regnier, M., Deschamps, A., Bardainne, T. & Gaucher, E., 2009. Focal mechanisms from sparse observations by nonlinear inversion of amplitudes: method and tests on synthetic and real data, *Bull. seism. Soc. Am.,* 99(4), 2243-2264.

Gudmundsson B. T. & Arnórsson, S., 2002. Geochemical monitoring of the Krafla and Námafjall geothermal areas, N-Iceland, *Geothermics,* 31(2) 195-243.

Hardebeck, J. L. & Shearer, P. M., 2002. A new method for determining first-motion focal mechanisms, *Bull. seism. Soc. Am.,* 92(6), 2264-2276.

Hardebeck, J. L. & Shearer, P. M., 2003. Using S/P amplitude ratios to constrain the focal mechanisms of small earthquakes, *Bull. seism. Soc. Am.,* 93(6), 2434-2444.

Heimann, S., 2011. A robust method to estimate kinematic earthquake source parameters, *PhD thesis,* Hamburg.

Hinkley, D. V., 1969. On the ratio of two correlated normal random variables, *Biometrika,* 56(3) 635-639.

Horálek, J., Jechumtálová, Z., Dorbath, L. & Šilený, J., 2010. Source mechanisms of microearthquakes induced in a fluid injection experiment at the HDR site Soultz-sous-Forêts (Alsace) in 2003 and their temporal and spatial variations, *Geophys. J. Int.,* 181, 1547-1565.

Houlié, N., Dreger, D. & Kim, A., 2014. GPS source solution of the 2004 Parkfield earthquake, *Sci. Rep.,* 4(3646), doi:10.1038/rep03646.

Hudson, J. A., Pearce, R. G. & Rogers, R. M., 1989. Source type plot for inversion of the moment tensor, *J. geophys. Res.,* 94(B1), 765-774.

Jeffreys, H., 1998. *Theory of Probability,* 3rd edn, Oxford University Press.

Kaeufl, P., Valentine, A. P., O'Toole, T. & Trampert, J., 2013. A framework for fast probabilistic centroid—moment-tensor determination—Inversion of regional static displacement measurements, *Geophys. J. Int.,* 196(3), 1676-1693.

Kennet, B. L. N., Marson-Pidgeen, K. & Sambridge, M. S., 2000. Seismic source characterization using a neighbourhood algorithm, *Geophys. Res. Lett.,* 27(20), 3401-3404.

Kim, A., 2011. Uncertainties in full waveform moment tensor inversion due to limited microseismic monitoring array geometry. *SEG San Antonio* 2011 *Annual Meeting,* (5), 1509-1513, doi:10.1190/1.3627488.

Kim, S. G., Kraeva, N. & Chen, Y. T., 2000. Source parameter determination of regional earthquakes in the Far East using moment tensor inversion of single-station data, *Tectonophysics,* 317, 125-136.

Knopoff, L. & Randall, M. J., 1970. The compensated linear-vector dipole: a possible mechanism for deep earthquakes, *J. geophys. Res.,* 75(26), 4957-4963.

Konca, A. O., Leprince, S., Avouac, J.-P. & Helmberger, D. V., 2010. Rupture process of the 1999 Mw 7.1 Duzce earthquake from joint analysis of SPOT, GPS, InSAR, strong-motion, and teleseismic data: a supershear rupture with variable rupture velocity, *Bull. seism. Soc. Am.,* 100(1), 267-288.

Kuge, K. & Lay, T., 1994. Systematic non-double-couple components of earthquake mechanisms: the role of fault zone irregularity, *J. geophys. Res.,* 99(B8), 15 457-15 467.

Laplace, P. S., 1812. Théorie analytique des probabilités, Ve. Courcier.

Lomax, A., Virieux, J., Volant, P. & Berge, C., 2000. Probabilistic earthquake location in 3D and layered models: Introduction of a Metropolis-Gibbs method and comparison with linear locations, in *Advances in Seismic Location,* pp. 101-134, eds Thurber, C. H. & Rabinowitz, N., Kluwer.

Lomax, A., Michelini, A. & Curtis, A., 2009. Earthquake Location, Direct, Global-Search Methods, in *Encyclopedia of Complexity and System Science,* pp. 1-33, ed. Meyer R A, Springer, doi:10.1007/978-3-642-27737-5_150-2.

Lundgren, P. & Salichon, J., 2000. Joint inversion of InSAR and teleseismic data for the slip history of the 1999 Izmit (Turkey) earthquake Izmit/Sapanca, *Geophys. Res. Lett.,* 27(20), 3389-3392.

Mildon, Z. K., Pugh, D. J., Tarasewicz, J., White, R. S., & Brandsdóttir, B., 2016. Closing crack earthquakes within the Krafla caldera, North Iceland, *Geophys. J. Int.,* submitted.

Minson, S. E., Simons, M. & Beck, J. L., 2013. Bayesian inversion for finite fault earthquake source models I-theory and algorithm, *Geophys. J. Int.,* 194(3), 1701-1726.

Mukherjee, S. Feigelson, E. D. F., Babu, G. J., Murtagh, F., Fraley, C. & Raftery, A., 1998. Three types of gamma-ray bursts, *The Astrophys. J.,* 508, 314-327.

Müller, G., 1973. Seismic moment and long-period radiation of underground nuclear explosions, *Bull. seism. Soc. Am.,* 63(3), 847-857.

O'Brien, G. S., Lokmer, I., De Barros, L., Bean, C. J., Saccorotti, G., Metaxian, J. P. & Patane, D., 2011. Time reverse location of seismic long-period events recorded on Mt Etna, *Geophys. J. Int.,* 184(1), 452-462.

O'Toole, T. B., 2013. Studies of earthquakes and microearthquakes using near-field seismic and geodetic observations, *PhD thesis,* University of Oxford.

Page, M. T., Cust, S., Archuleta, R. J. & Carlson, J. M., 2009. Constraining earthquake source inversions with GPS data 1: resolution based removal of artifacts, *J. geophys. Res.,* 114(B01314), doi:10.1029/2007JB005449.

Panza, G. F. & Sarao, A., 2000. Monitoring volcanic and geothermal areas by full seismic moment tensor inversion: are non-double-couple components always artefacts of modelling?, *Geophys. J. Int.,* 143(2), 353-364.

Pugh, D. J., White, R. S. & Christie, P. A. F., 2016. Automatic Bayesian polarity determination, *Geophys. J. Int.,* 206(1) 275-291.

Reasenberg, P. A. & Oppenheimer, D., 1985. FPFIT, FPPLOT and FPPAGE: Fortran computer programs for calculating and displaying earthquake fault-plane solutions—OFR 85-739, Tech. rep., USGS.

Riedesel, M. A. & Jordan, T. H., 1989. Display and assessment of seismic moment tensors, *Bull. seism. Soc. Am.,* 79(1), 85-100.

Schuler, J. et al., 2015. Seismic imaging of the shallow crust beneath the Krafla central volcano, NE Iceland, *J. geophys. Res.,* 120, 7156-7173.

Schwarz, G., 1978. Estimating the dimension of a model, *Ann. Stat.,* 6(2), 461-464.

Sivia, D. S., 2000. *Data Analysis: A Bayesian Tutorial,* Oxford Univ Press.

Snoke, J. A., 2003. FOCMEC: FOCaI MEChanism determinations, Tech. rep.

Tape, W. & Tape, C., 2012a. A geometric setting for moment tensors, *Geophys. J. Int.,* 190(1), 476-498.

Tape, W. & Tape, C., 2012b. A geometric comparison of source-type plots for moment tensors, *Geophys. J. Int.,* 190(1), 499-510.

Templeton, D. C. & Dreger, D. S., 2006. Non-double-couple earthquakes in the Long Valley volcanic region, *Bull. seism. Soc. Am.,* 96(1), 69-79.

Vasco, D. W., 1990. Moment-tensor invariants: searching for non-double-couple earthquakes, *Bull. seism. Soc. Am.,* 80(2), 354-371.

Vavryčuk, V., 2007. On the retrieval of moment tensors from borehole data, *Geophys. Prospect.,* 55(3), 381-391.

Vavryčuk, V., Bohnhoff, M., Jechumtálová, Z., Kolar, P. & Šilený, J., 2008. Non-double-couple mechanisms of microearthquakes induced during the 2000 injection experiment at the KTB site, Germany: a result of tensile faulting or anisotropy of a rock?, *Tectonophysics,* 456(1-2), 74-93.

Voigt, W., 1910. *Lehrbuch der Kristallphysik,* B. G. Teubner.

Šilený, J., 2004. Regional moment tensor uncertainty due to mismodeling of the crust, *Tectonophysics,* 383(3-4), 133-147.

Šilený, J., 2009. Resolution of non-double-couple mechanisms: simulation of hypocenter mislocation and velocity structure mismodeling, *Bull. seism. Soc. Am.,* 99(4), 2265-2272.

Šilený, J. & Milev, A., 2006. Seismic moment tensor resolution on a local scale: simulated rockburst and mine-induced seismic events in the Kopanang gold mine, South Africa, *Pure appl. Geophys.,* 163(8) 1495-1513.

Šilený, J., Campus, P. & Panza, G. F., 1996, Seismic moment tensor resolution by waveform inversion of a few local noisy records—I. Synthetic tests, *Geophys. J. Int.,* 126, 605-619.

Šilený, J., Pšenčík, I. & Young, R. P., 2001. Point-source inversion neglecting a nearby free surface: simulation of the underground Research Laboratory, Canada, *Geophys. J. Int.,* 146(1), 171-180.

Wadati, K., 1933. On the travel time of earthquake waves. (Part II), *Geophys. Mag.,* VII, 101-111.

Wadati, K. & Oki, S., 1933. On the travel time of earthquake waves. (Part III), *Geophys. Mag.,* VII, 113-137.

Walsh, D., Arnold, R. & Townend, J., 2009. A Bayesian approach to determining and parametrizing earthquake focal mechanisms, *Geophys. J. Int.,* 176(1), 235-255.

Wéber, Z., 2006. Probabilistic local waveform inversion for moment tensor and hypocentral location, *Geophys. J. Int.,* 165(2), 607-621.

Weston, J., Ferreia A. M. G. & Funning, G. J., 2014. Joint earthquake source inversions using seismo-geodesy and 3-D earth models, *Geophys. J. Int.,* 198(2), 671-696.

Yokta, Y., Kawazoe, Y., Yun, S., Oki, S., Aoki, Y. & Koketsu, K., 2012. Joint inversion of teleseismic and InSAR datasets for the rupture process of the 2010 Yushu, China, earthquake, *Earth Planets Space,* 64(11), 1047-1051.

Zollo, A. & Bernard, P., 2007. Fault mechanisms from near-source data: joint inversion of S polarizations and P polarities, *Geophys. J. Int.,* 104(3), 441-451.

APPENDIX A: STATION PROPAGATION COEFFICIENTS

In the case of a homogeneous isotopic velocity structure, the Green functions are known for the different components. In other cases, it is necessary to determine the ray angles between the source and the receiver for an appropriate geological structure.

Considering a system of orthogonal basis vectors on the sphere with $\phi$ the angle from the x axis and $\theta$ the angle from the z axis gives $\Gamma$ the radial unit vector, $\Theta$ the unit vector along lines of longitude, and $\Phi$ the equatorial unit vector:

$$\Gamma = \begin{pmatrix} \sin\theta\cos\phi \\ \sin\theta\sin\phi \\ \cos\theta \end{pmatrix}, \tag{A1}$$

$$\Theta = \begin{pmatrix} \cos\theta\cos\phi \\ \cos\theta\sin\phi \\ \sin\theta \end{pmatrix}, \tag{A2}$$

$$\Phi = \begin{pmatrix} -\sin\phi \\ \cos\phi \\ 0 \end{pmatrix}. \tag{A3}$$

For a point with a take-off angle $\theta$ and azimuth $\phi$, the displacement components are (following Aki & Richards 2002):

$$u_P = \frac{1}{4\pi\rho\alpha^3 r}(\Gamma^T M \Gamma)\Gamma = \mathcal{F}_P(\Gamma^T M \Gamma)\Gamma, \tag{A4}$$

$$u_{SV} = \frac{1}{4\pi\rho\beta^3 r}(\Theta^T M \Gamma)\Theta = \mathcal{F}_{SV}(\Theta^T M \Gamma)\Theta, \tag{A5}$$

$$u_{SH} = \frac{1}{4\pi\rho\beta^3 r}(\Phi^T M \Gamma)\Phi = \mathcal{F}_{SH}(\Phi^T M \Gamma)\Phi, \tag{A6}$$

where $\mathcal{F}$ is the propagation effect, containing the effects from geometric spreading and the velocity structure.

The radiation components (Chapman 2004, Chapter 4) can be given by $$\mathcal{R}_P = \Gamma^\tau M \Gamma. \tag{A7}$$

$$\mathcal{R}_{SV} = \Theta^\tau M \Gamma. \tag{A8}$$

$$\mathcal{R}_{SH} = \Phi^\tau M \Gamma. \tag{A9}$$

The radiation components can be used to determine the coefficients of the different moment tensor components. This allows a calculation of the amplitude for the different components at the source, which can be used to help determine the moment tensor. The amplitude of the P component at the source is given by $$\mathcal{R}_P = (\sin\theta\cos\phi \;\; \sin\theta\sin\phi \;\; \cos\theta) \begin{pmatrix} M_{11} & M_{12} & M_{13} \\ M_{12} & M_{22} & M_{23} \\ M_{13} & M_{23} & M_{33} \end{pmatrix} \begin{pmatrix} \sin\theta\cos\phi \\ \sin\theta\sin\phi \\ \cos\theta \end{pmatrix} \tag{A10}$$

$$\mathcal{R}_P = M_{11}\sin^2\theta\cos^2\phi + M_{22}\sin^2\theta\sin^2\phi + M_{33}\cos^2\theta + M_{12}\sin^2\theta\sin 2\phi + M_{13}\sin 2\theta\cos\phi + M_{23}\sin 2\theta\sin\phi. \tag{A11}$$

Similarly for the SH and SV components:

$$\mathcal{R}_{SV} = \frac{1}{2}M_{11}\sin 2\theta\cos^2\phi + \frac{1}{2}M_{22}\sin 2\theta\sin^2\phi - \frac{1}{2}M_{33}\sin 2\theta + M_{12}\sin 2\theta\cos\phi\sin\phi + M_{13}\cos 2\theta\cos\phi + M_{23}\cos 2\theta\sin\phi. \tag{A12}$$

$$\mathcal{R}_{SH} = -\frac{1}{2}M_{11}\sin\theta\sin 2\phi + \frac{1}{2}M_{22}\sin\theta\sin 2\phi + M_{12}\sin\theta\cos 2\phi - M_{13}\cos\theta\sin\phi + M_{23}\cos\theta\cos\phi. \tag{A13}$$

These coefficients describe the amplitude of the different components at the source. However, propagation effects need to be accounted for when extending this further to a measurement at a receiver. The coefficients produced here are the same as those reported by Dahm (1996).

These amplitude coefficients can be written in terms of the moment tensor six-vector (eq. 1):

$$\begin{pmatrix} \mathcal{R}_P \\ \mathcal{R}_{SV} \\ \mathcal{R}_{SH} \end{pmatrix} = \begin{pmatrix} \sin^2\theta\cos^2\phi & 1/2\sin 2\theta\cos^2\phi & -1/2\sin\theta\sin 2\phi \\ \sin^2\theta\sin^2\phi & 1/2\sin 2\theta\sin^2\phi & 1/2\sin\theta\sin 2\phi \\ \cos^2\theta & -1/2\sin 2\theta & 0 \\ 1/\sqrt{2}\sin 2\theta\sin\phi & 1/\sqrt{2}\cos 2\theta\sin\phi & 1/\sqrt{2}\cos\theta\cos\phi \\ 1/\sqrt{2}\sin 2\theta\cos\phi & 1/\sqrt{2}\cos 2\theta\cos\phi & -1/\sqrt{2}\cos\theta\sin\phi \\ 1/\sqrt{2}\sin^2\theta\sin\phi & 1/\sqrt{2}\sin 2\theta\cos\phi\sin\phi & 1/\sqrt{2}\sin\theta\cos 2\phi \end{pmatrix}^T \begin{pmatrix} M_{11} \\ M_{22} \\ M_{33} \\ \sqrt{2}M_{23} \\ \sqrt{2}M_{13} \\ \sqrt{2}M_{12} \end{pmatrix}. \tag{A14}$$

Consequently the station propagation coefficients are given by $$a_P = \begin{pmatrix} \sin^2\theta\cos^2\phi \\ \sin^2\theta\sin^2\phi \\ \cos^2\theta \\ 1/\sqrt{2}\sin 2\theta\sin\phi \\ 1/\sqrt{2}\sin 2\theta\cos\phi \\ 1/\sqrt{2}\sin^2\theta\sin 2\phi \end{pmatrix}^T, \tag{A15}$$

$$a_{SV} = \begin{pmatrix} 1/2\sin 2\theta\cos^2\phi \\ 1/2\sin 2\theta\sin^2\phi \\ -1/2\sin 2\theta \\ 1/\sqrt{2}\cos 2\theta\sin\phi \\ 1/\sqrt{2}\cos 2\theta\cos\phi \\ 1/\sqrt{2}\sin 2\theta\cos\phi\sin\phi \end{pmatrix}^T, \tag{A16}$$

$$a_{SH} = \begin{pmatrix} -1/2\sin\theta\sin 2\phi \\ 1/2\sin\theta\sin 2\phi \\ 0 \\ 1/\sqrt{2}\cos\theta\cos\phi \\ -1/\sqrt{2}\cos\theta\sin\phi \\ 1/\sqrt{2}\sin\theta\cos 2\phi \end{pmatrix}^T. \tag{A17}$$

APPENDIX B: MAXIMUM ENTROPY DISTRIBUTION FOR MEAN AND VALIANCE

Consider a function $g(x)$ with mean $\mu$ and variance $\sigma^2$. The entropy is given by (e.g. Cover & Thomas 2005):

$$S = \int_{-\infty}^{\infty} g(x)\ln(g(x))dx. \tag{B1}$$

with the maximum entropy at the stationary point of the functional:

$$F(x,g(x),g'(x))dx = g(x)\ln(g(x)). \tag{B2}$$

There are two constraints to apply: $g(x)$ is normalized:

$$\int_{-\infty}^{\infty} G(x, g(x), g'(x))dx = \int_{-\infty}^{\infty} g(x)dx = 1. \tag{B3}$$

and the variance is given by $$\int_{-\infty}^{\infty} H(x, g(x), g'(x))dx = \int_{-\infty}^{\infty} (x-\mu)^2 g(x)dx = \sigma^2. \tag{B4}$$

The constrained stationary value can be found by maximizing the Euler-Lagrange functional:

$$L(x, g(x), g'(x)) = \int_{-\infty}^{\infty} F + \lambda G + \nu H, \tag{B5}$$

-continued $$\frac{\partial F}{\partial g} - \frac{d}{dx}\frac{\partial F}{\partial g'} + \lambda\left(\frac{\partial G}{\partial g} - \frac{d}{dx}\frac{\partial G}{\partial g'}\right) + \nu\left(\frac{\partial H}{\partial g} - \frac{d}{dx}\frac{\partial H}{\partial g'}\right) = 0. \quad (B6)$$

where λ and ν at Lagrange undetermined multipliers. The Euler-Lagrange equation for this functional is given by:

$$\ln(g(x)) + 1 + \lambda + \nu(x-\mu)^2 = 0. \quad (B7)$$

because F, G, and H are independent of g'(x). This can be solved to give an expression for g(x):

$$g(x) = e^{-\nu(x-\mu)^2 - \lambda - 1}. \quad (B8)$$

Applying the constraints on g(x) (eqs. B3 and B4) gives a relationship for λ and ν:

$$e^{-\lambda-1} \int_{-\infty}^{\infty} e^{-\nu(x-\mu)^2} dx = 1. \quad (B9)$$

$$\therefore e^{-\lambda-1} = \sqrt{\frac{\nu}{\pi}},$$

$$ec^{-\lambda-1} \int_{-\infty}^{\infty} (x-\mu)^2 e^{-\nu(x-\mu)^2} dx = \sigma^2, \quad (B10)$$

$$\therefore \frac{e^{-\lambda-1}}{2}\sqrt{\frac{\pi}{\nu^3}} = \sigma^2.$$

$$\nu = \frac{1}{2\sigma^2}. \quad (B11)$$

$$e^{-\lambda-1} = \frac{1}{\sqrt{2\pi\sigma^2}}. \quad (B12)$$

Substituting for these into eq. (B8) gives a Gaussian distribution for the maximum entropy distribution for a mean and variance:

$$g(x) = \frac{1}{\sqrt{2\pi\sigma^2}} e^{\frac{-(x-\mu)^2}{2\sigma^2}}. \quad (B13)$$

What is claimed is:

1. A method for performing a hydraulic fracturing process, comprising:
    injecting fluid into a well to create cracks in downhole rock formations;
    obtaining microseismic data from the downhole rock formations at least while injecting the fluid into the well;
    performing at least two forward modelling source parameter estimations on the microseismic data, the at least two forward modelling source parameter estimations including a first estimation using a full moment tensor space source model and a second estimation constrained to one or more source model types that include at least a double-couple source model;
    calculating likelihoods of the microseismic data for the full moment tensor space source model and each of the one or more source model types by forward-modelling synthetic data from a sampled source parameter probability distribution derived from each of the at least two forward modelling source parameter estimations, and by comparing the synthetic data with the microseismic data;
    marginalizing the calculated likelihoods over prior probabilities for model parameters for the full moment tensor space source model and the one or more source model types to give respective likelihoods for the full moment tensor space source model and the one or more source model types;
    using Bayesian inference to convert the full moment tensor space source model likelihoods, the respective source model type likelihoods, and the prior probabilities to posterior probabilities for the full moment tensor space source model and the one or more source model types;
    comparing the posterior probabilities for the full tensor space source model and the one or more source model types; and
    using the comparison of the posterior probabilities to reveal probabilities an event triggering the microseismic data is a fracture opening event, a fracture closing event, and a slip on a fault plane.

2. The method according to claim 1, wherein the constrained source parameter estimation is performed for one or more source model types selected from the group consisting of: a volumetric opening source model type, a volumetric closing source model type, and a combined tensile crack and double-couple source model type.

3. The method according to claim 1, wherein the sampled source parameter probability distribution includes a probability distribution of seismic wave first-arrival polarity.

4. The method according to claim 1, wherein the sampled source parameter probability distribution includes a probability distribution of seismic wave amplitude ratio.

5. The method according to claim 1, including a preliminary step of performing seismic testing using one or more hydrophones, geophones, accelerometers, and/or distributed acoustic sensing to obtain the microseismic data.

6. The method according to claim 1, wherein using the comparison of the posterior probabilities includes:
    revealing the extent of cracks created in response to the injection of the fluid.

7. The method according to claim 1, wherein using the comparison of the posterior probabilities includes quantifying the fracture opening or closing.

8. The method according to claim 1, further comprising:
    supplying proppant to the cracks in the downhole rock formations, an amount of the proppant being based on the quantified fracture opening.

9. The method according to claim 1, wherein comparing the posterior probabilities for the unconstrained source model and the one or more source model types includes normalizing the posterior probabilities for a particular prior probability together for the full moment tensor space source model and the double-couple source model.

10. The method according to claim 1, wherein comparing the posterior probabilities includes comparing a best fitting double-couple and full moment tensor solution to the event triggering the microseismic data.

11. A method for performing a perforation operation, comprising:
    perforating a well to initiate cracks in a downhole rock formation;
    obtain microseismic data from the rock formation at least while perforating the well;
    performing at least two forward modelling source parameter estimations on the microseismic data, the at least two forward modelling source parameter estimations including a first estimation with an unconstrained source model and a second estimation that is constrained to one or more selected source model types that include at least a double-couple source model;

calculating likelihoods of the microseismic data for the unconstrained source model and each of the one or more selected source model types by forward-modelling synthetic data from a sampled parameter probability distribution derived from each of the at least two forward modelling source parameter estimations, and comparing the synthetic data against the microseismic data;

marginalizing over prior probabilities for model parameters for the unconstrained source model and each of the one or more selected source model types; and using Bayesian inference to convert the calculated likelihoods and the prior probabilities to posterior probabilities for the unconstrained source model and each of the one or more source model types;

comparing the posterior probabilities for the unconstrained source model and the one or more source model types; and using the comparison of the posterior probabilities to reveal probabilities an event triggering the microseismic data is a fracture opening event, a fracture closing event, and a slip on a fault plane.

* * * * *